(12) United States Patent
Blanche et al.

(10) Patent No.: US 11,185,125 B2
(45) Date of Patent: Nov. 30, 2021

(54) FOOTWEAR WITH JOINTED SOLE STRUCTURE FOR EASE OF ACCESS

(71) Applicant: NIKE, Inc., Beaverton, OR (US)

(72) Inventors: Rory S. Blanche, Portland, OR (US); Timothy P. Hopkins, Lake Oswego, OR (US); Elizabeth Langvin, Sherwood, OR (US); Kaigin Olafson, Banks, OR (US); Haley L. Toelle, Portland, OR (US)

(73) Assignee: NIKE, Inc., Beaverton, OR (US)

(*) Notice: Subject to any disclaimer, the term of this patent is extended or adjusted under 35 U.S.C. 154(b) by 0 days.

(21) Appl. No.: 16/718,845

(22) Filed: Dec. 18, 2019

(65) Prior Publication Data

US 2020/0205512 A1 Jul. 2, 2020

Related U.S. Application Data

(60) Provisional application No. 62/786,056, filed on Dec. 28, 2018, provisional application No. 62/923,049, filed on Oct. 18, 2019.

(51) Int. Cl.
*A43B 11/00* (2006.01)
*A43B 13/14* (2006.01)
(Continued)

(52) U.S. Cl.
CPC ............ *A43B 13/141* (2013.01); *A43B 11/00* (2013.01); *A43B 13/28* (2013.01); *A43B 13/37* (2013.01); *A43B 23/088* (2013.01); *B33Y 80/00* (2014.12)

(58) Field of Classification Search
CPC ....... A43B 13/141; A43B 13/14; A43B 13/16; A43B 11/00
(Continued)

(56) References Cited

U.S. PATENT DOCUMENTS

| 4,497 A | 5/1846 | Vetter |
| 75,048 A | 3/1868 | Perley |

(Continued)

FOREIGN PATENT DOCUMENTS

| CN | 87209219 U | 5/1988 |
| CN | 87103983 A | 12/1988 |

(Continued)

OTHER PUBLICATIONS

Aidin H., Under Armour's Innovative Fall/Winter2016 Collection Now Available at All Brand Houses, Aug. 27, 2016, https://www.runsociety.com/news/under-armours-innovative-fallwinter-2016-collection-now-available-at-all-brand-houses/ (accessed Nov. 4, 2017).

(Continued)

*Primary Examiner* — Marie D Bays
(74) *Attorney, Agent, or Firm* — Quinn IP Law

(57) ABSTRACT

An article of footwear includes a sole structure that has a front midsole component and a rear midsole component. A connecting member connects the front midsole component to the rear midsole component. The connecting member defines a groove at a lower side of the sole structure between the front midsole component and the rear midsole component. The front midsole component and the rear midsole component are pivotable relative to one another at the groove between a use position and an access position. Confronting surfaces of the connecting member at the groove are closer to one another in the access position than in the use position so that the groove is relatively open in the use position, and the groove is relatively closed in the access position.

20 Claims, 18 Drawing Sheets

(51) Int. Cl.
 A43B 13/28 (2006.01)
 A43B 13/37 (2006.01)
 A43B 23/08 (2006.01)
 B33Y 80/00 (2015.01)

(58) Field of Classification Search
 USPC .......................................... 36/102, 138, 105
 See application file for complete search history.

(56) References Cited

U.S. PATENT DOCUMENTS

| | | | |
|---|---|---|---|
| 171,301 A | 12/1875 | McKee | |
| 417,460 A | 12/1889 | Wurtele | |
| 474,574 A | 5/1892 | Bruzon | |
| 503,588 A | 8/1893 | Elterich et al. | |
| 537,627 A | 4/1895 | Bixby et al. | |
| 558,937 A | 4/1896 | Edmonds | |
| 808,948 A | 1/1906 | Roberts | |
| 827,330 A | 7/1906 | Tillson | |
| 863,549 A | 8/1907 | Metz | |
| 955,337 A | 4/1910 | Lawlor | |
| 1,081,678 A * | 12/1913 | Langerak | A43B 11/00 36/138 |
| 1,494,236 A | 5/1924 | Greathouse | |
| 1,585,049 A | 5/1926 | Skoglund | |
| 1,603,144 A | 10/1926 | Nichols | |
| 1,686,175 A | 10/1928 | Read | |
| 1,812,622 A | 6/1931 | Costello | |
| 2,069,752 A | 2/1937 | Dorr | |
| 2,252,315 A | 8/1941 | Doree | |
| 2,302,596 A | 11/1942 | Bigio | |
| 2,357,980 A | 9/1944 | Spiro | |
| 2,450,250 A | 9/1948 | Napton | |
| 2,452,502 A | 10/1948 | Tarbox | |
| 2,452,649 A | 11/1948 | Graves | |
| 2,487,227 A | 11/1949 | Eberle | |
| 2,619,744 A | 12/1952 | Mattes | |
| 2,693,039 A | 11/1954 | Balut | |
| 2,736,110 A | 2/1956 | Hardimon | |
| 2,746,178 A | 5/1956 | Miller et al. | |
| 2,825,155 A | 3/1958 | Hines | |
| 2,920,402 A | 1/1960 | Minera | |
| 3,039,207 A | 6/1962 | Lincors | |
| 3,146,535 A | 9/1964 | Owings | |
| 3,192,651 A | 7/1965 | Smith | |
| 3,283,423 A | 11/1966 | Schovee | |
| 3,349,505 A | 10/1967 | Lopez | |
| 3,400,474 A | 9/1968 | Tendler | |
| 3,436,842 A | 4/1969 | Sachs | |
| 3,681,860 A | 8/1972 | Bidegain | |
| 4,095,356 A | 6/1978 | Robran et al. | |
| 4,136,468 A | 1/1979 | Munschy | |
| 4,309,832 A | 1/1982 | Hunt | |
| 4,489,509 A | 12/1984 | Libit | |
| 4,507,879 A | 4/1985 | Dassler | |
| 4,559,724 A | 12/1985 | Norton | |
| 4,562,651 A | 1/1986 | Frederick et al. | |
| 4,573,457 A | 3/1986 | Parks | |
| 4,594,798 A | 6/1986 | Autry et al. | |
| 4,599,811 A | 7/1986 | Rousseau | |
| 4,615,126 A | 10/1986 | Mathews | |
| 4,649,656 A | 3/1987 | Cox et al. | |
| 4,665,634 A | 5/1987 | Diaz | |
| 4,776,111 A | 10/1988 | Crowley | |
| 4,944,099 A | 7/1990 | Davis | |
| 4,959,914 A | 10/1990 | Hilgarth | |
| 4,972,613 A | 11/1990 | Loveder | |
| 5,054,216 A | 10/1991 | Lin | |
| 5,060,401 A | 10/1991 | Whatley | |
| 5,090,140 A | 2/1992 | Sessa | |
| 5,127,170 A | 7/1992 | Messina | |
| 5,152,082 A | 10/1992 | Culpepper | |
| 5,181,331 A | 1/1993 | Berger | |
| D333,377 S | 2/1993 | Hatfield | |
| 5,184,410 A | 2/1993 | Hamilton | |
| 5,222,313 A | 6/1993 | Dowdy et al. | |
| 5,279,051 A | 1/1994 | Whatley | |
| 5,282,327 A | 2/1994 | Ogle | |
| 5,341,583 A | 8/1994 | Hallenbeck | |
| 5,345,698 A | 9/1994 | Billet et al. | |
| 5,371,957 A | 12/1994 | Gaudio | |
| 5,467,537 A | 11/1995 | Aveni et al. | |
| 5,481,814 A * | 1/1996 | Spencer | A43B 7/00 36/103 |
| 5,557,866 A | 9/1996 | Prengler | |
| 5,570,523 A | 11/1996 | Lin | |
| 5,682,687 A | 11/1997 | Arai | |
| 5,813,144 A | 9/1998 | Prengler | |
| 5,842,292 A | 12/1998 | Siesel | |
| 5,884,420 A | 3/1999 | Donnadieu | |
| 5,983,530 A | 11/1999 | Chou | |
| 5,997,027 A | 12/1999 | Jungkind | |
| 6,000,148 A | 12/1999 | Cretinon | |
| 6,189,239 B1 * | 2/2001 | Gasparovic | A43B 3/30 36/102 |
| 6,290,559 B1 | 9/2001 | Scott | |
| 6,298,582 B1 | 10/2001 | Friton et al. | |
| 6,378,230 B1 | 4/2002 | Rotem et al. | |
| 6,438,872 B1 | 8/2002 | Chil et al. | |
| 6,557,271 B1 | 5/2003 | Weaver, III | |
| 6,578,288 B2 | 6/2003 | Bernstein | |
| 6,594,921 B2 | 7/2003 | Laio et al. | |
| 6,643,954 B2 | 11/2003 | Voswinkel | |
| 6,684,533 B1 | 2/2004 | Su | |
| 6,718,658 B2 | 4/2004 | Karasawa | |
| 6,817,116 B2 | 11/2004 | Chil et al. | |
| 6,883,254 B2 | 4/2005 | Miller et al. | |
| 6,925,732 B1 | 8/2005 | Clarke | |
| 6,938,361 B2 | 9/2005 | Su | |
| 6,957,504 B2 | 10/2005 | Morris | |
| 6,964,119 B2 | 11/2005 | Weaver, III | |
| 7,055,268 B2 | 6/2006 | Ha | |
| 7,059,069 B2 | 6/2006 | Raluy et al. | |
| 7,080,468 B2 | 7/2006 | Miller et al. | |
| 7,101,604 B1 | 9/2006 | Minges | |
| 7,103,994 B2 | 9/2006 | Johnson | |
| 7,127,837 B2 | 10/2006 | Ito | |
| 7,168,190 B1 | 1/2007 | Gillespie | |
| 7,178,270 B2 | 2/2007 | Hurd et al. | |
| 7,188,438 B1 | 3/2007 | Bowen | |
| 7,225,563 B2 | 6/2007 | Chen et al. | |
| 7,284,341 B2 | 10/2007 | Moseley | |
| 7,287,294 B2 | 10/2007 | Miller et al. | |
| 7,439,837 B2 | 10/2008 | McDonald | |
| 7,448,148 B2 | 11/2008 | Martinez et al. | |
| 7,472,495 B2 | 1/2009 | Milbourn | |
| 7,526,881 B2 | 5/2009 | Jones et al. | |
| 7,581,337 B2 | 9/2009 | Miller et al. | |
| 7,607,242 B2 | 10/2009 | Karandonis et al. | |
| 7,685,747 B1 | 3/2010 | Gasparovic et al. | |
| 7,694,435 B1 | 4/2010 | Kiser et al. | |
| 7,735,244 B1 | 6/2010 | Ameche | |
| 7,793,438 B1 * | 9/2010 | Busse | A43B 11/02 36/105 |
| 7,823,299 B1 | 11/2010 | Brigham | |
| 7,900,377 B1 | 3/2011 | Perenich | |
| 7,905,033 B1 | 3/2011 | Perenich | |
| 7,913,422 B1 | 3/2011 | Perenich | |
| 7,950,166 B1 | 5/2011 | Perenich | |
| 7,975,403 B2 | 7/2011 | Mosher | |
| 7,984,571 B2 | 7/2011 | Pellegrini | |
| 8,006,410 B2 | 8/2011 | Romboli et al. | |
| 8,020,317 B1 | 9/2011 | Sokolowski | |
| D648,512 S | 11/2011 | Schlageter et al. | |
| 8,065,819 B2 | 11/2011 | Kaufman | |
| 8,161,669 B2 * | 4/2012 | Keating | A43C 11/12 36/112 |
| 8,171,657 B1 | 5/2012 | Perenich | |
| 8,215,030 B2 | 7/2012 | Bowen et al. | |
| 8,225,534 B2 | 7/2012 | Mueller et al. | |
| 8,225,535 B2 | 7/2012 | Dillenbeck | |
| 8,245,418 B2 | 8/2012 | Paintin et al. | |
| 8,245,421 B2 * | 8/2012 | Baudouin | A43B 11/00 36/103 |

(56) References Cited

U.S. PATENT DOCUMENTS

| | | |
|---|---|---|
| 8,256,146 B2 | 9/2012 | Loverin |
| 8,365,443 B2 | 2/2013 | Huynh |
| D680,719 S | 4/2013 | Dardinski |
| 8,468,721 B2 | 6/2013 | Sokolowski |
| 8,468,723 B2 | 6/2013 | Malka-Harari |
| 8,499,474 B2 | 8/2013 | Kaufman |
| 8,539,698 B1 | 9/2013 | Woodruff |
| 8,549,774 B2 | 10/2013 | Meschter et al. |
| 8,627,582 B2 | 1/2014 | Perenich |
| 8,627,583 B2 | 1/2014 | Perenich |
| 8,635,791 B2 | 1/2014 | Baudouin et al. |
| 8,656,613 B2 | 2/2014 | Stockbridge et al. |
| 8,677,656 B2 | 3/2014 | Nishiwaki et al. |
| 8,745,893 B2 | 6/2014 | Gavrieli et al. |
| 8,763,275 B2 | 7/2014 | Shalom et al. |
| 8,769,845 B2 | 7/2014 | Lin |
| 8,834,770 B2 | 9/2014 | Nakano |
| 8,919,015 B2 | 12/2014 | Holt et al. |
| 9,015,962 B2 | 4/2015 | Boudreau et al. |
| 9,032,646 B2 | 5/2015 | Perenich |
| 9,044,063 B2 | 6/2015 | Loverin et al. |
| 9,061,096 B2 | 6/2015 | Taylor et al. |
| 9,089,184 B1 | 7/2015 | Kiser et al. |
| 9,095,188 B2 | 8/2015 | Cavaliere |
| 9,119,436 B1 | 9/2015 | Ardell et al. |
| 9,119,437 B2 | 9/2015 | Weller et al. |
| 9,144,262 B2 | 9/2015 | Ardell et al. |
| 9,173,451 B2 | 11/2015 | Shim |
| 9,226,543 B2 | 1/2016 | Campbell |
| 9,254,018 B2 | 2/2016 | Bliss |
| 9,265,305 B2 | 2/2016 | Hatfield et al. |
| 9,301,570 B2 | 4/2016 | Hwang |
| 9,314,055 B2 | 4/2016 | Moran |
| 9,314,067 B2 | 4/2016 | Bock |
| 9,363,980 B2 | 6/2016 | Lander |
| 9,392,843 B2 | 7/2016 | Callahan et al. |
| 9,392,844 B1 | 7/2016 | Burrell |
| 9,398,785 B2 | 7/2016 | Horacek |
| 9,398,786 B2 | 7/2016 | Gavrieli et al. |
| 9,414,640 B2 | 8/2016 | Nichols |
| 9,433,256 B2 | 9/2016 | Callahan et al. |
| 9,445,644 B2 | 9/2016 | Cressman et al. |
| 9,474,330 B2 | 10/2016 | Panian et al. |
| 9,480,299 B2 | 11/2016 | Dinndorf et al. |
| D776,420 S | 1/2017 | Petrie |
| 9,675,132 B2 | 6/2017 | Marshall |
| 9,820,527 B2 | 11/2017 | Pratt et al. |
| 9,839,261 B2 | 12/2017 | Hatfield et al. |
| 9,854,875 B2 | 1/2018 | Hatfield et al. |
| 9,877,542 B2 | 1/2018 | Pratt |
| 9,949,533 B2 | 4/2018 | Feinstein |
| 10,159,310 B2 | 12/2018 | Sullivan |
| 10,602,802 B2* | 3/2020 | Hopkins ............... A43B 3/248 |
| 10,660,401 B1 | 5/2020 | Pratt et al. |
| 10,779,607 B1* | 9/2020 | Chandel ................ A43B 3/26 |
| 11,000,091 B1* | 5/2021 | Kyle ..................... A43B 11/00 |
| 2002/0144434 A1 | 10/2002 | Farys et al. |
| 2002/0174568 A1 | 11/2002 | Neiley |
| 2003/0200680 A1 | 10/2003 | Chang |
| 2004/0111921 A1 | 6/2004 | Lenormand |
| 2005/0039348 A1 | 2/2005 | Raluy et al. |
| 2005/0060913 A1 | 3/2005 | Chil et al. |
| 2005/0066548 A1 | 3/2005 | Chil et al. |
| 2007/0011917 A1 | 1/2007 | Hayes |
| 2007/0039208 A1 | 2/2007 | Bove et al. |
| 2007/0074425 A1 | 4/2007 | Leong |
| 2007/0186441 A1 | 8/2007 | Chen |
| 2007/0199211 A1 | 8/2007 | Campbell |
| 2007/0199213 A1 | 8/2007 | Campbell et al. |
| 2007/0209234 A1 | 9/2007 | Chou |
| 2008/0000106 A1 | 1/2008 | Culpepper |
| 2008/0086911 A1 | 4/2008 | Labbe |
| 2008/0141562 A1 | 6/2008 | Peveto |
| 2008/0168683 A1* | 7/2008 | Keating ................. A43C 11/12 36/102 |
| 2008/0263896 A1* | 10/2008 | Karandonis ........... A43C 11/12 36/89 |
| 2008/0307673 A1 | 12/2008 | Johnson |
| 2009/0025260 A1 | 1/2009 | Nakano |
| 2010/0251572 A1* | 10/2010 | Baudouin ............. A43B 11/00 36/103 |
| 2010/0319216 A1 | 12/2010 | Grenzke et al. |
| 2011/0016751 A1 | 1/2011 | Somerville |
| 2011/0146106 A1 | 6/2011 | Kaufman |
| 2011/0247238 A1 | 10/2011 | Chestnut |
| 2012/0079746 A1 | 4/2012 | Ferreira et al. |
| 2012/0204450 A1 | 8/2012 | Girbaud |
| 2012/0317839 A1 | 12/2012 | Pratt |
| 2013/0185959 A1 | 7/2013 | Coleman |
| 2013/0219747 A1 | 8/2013 | Lederer |
| 2014/0000131 A1 | 1/2014 | Meschter et al. |
| 2014/0013624 A1 | 1/2014 | Stockbridge et al. |
| 2014/0096415 A1 | 4/2014 | Long |
| 2014/0115925 A1 | 5/2014 | Hurd et al. |
| 2014/0250723 A1 | 9/2014 | Kohatsu |
| 2014/0298687 A1* | 10/2014 | Flinterman ........... A43B 13/14 36/103 |
| 2014/0305005 A1 | 10/2014 | Yeh |
| 2014/0310992 A1 | 10/2014 | Shalom et al. |
| 2014/0360049 A1 | 12/2014 | Panian et al. |
| 2015/0020416 A1* | 1/2015 | Wiens ................ A43B 23/0295 36/102 |
| 2015/0047223 A1* | 2/2015 | Flinterman .......... A43B 3/0036 36/83 |
| 2015/0047227 A1 | 2/2015 | Fallon et al. |
| 2015/0096197 A1 | 4/2015 | Salinas |
| 2015/0113834 A1 | 4/2015 | Dojan et al. |
| 2015/0143720 A1 | 5/2015 | Avar |
| 2015/0196095 A1 | 7/2015 | Chapman |
| 2015/0216252 A1 | 8/2015 | Wiens |
| 2015/0289595 A1 | 10/2015 | Rushbrook et al. |
| 2015/0305432 A1 | 10/2015 | Wiens |
| 2015/0305442 A1 | 10/2015 | Ravindran |
| 2015/0374065 A1 | 12/2015 | DiFrancisco |
| 2016/0128429 A1 | 5/2016 | Hatfield et al. |
| 2016/0166006 A1 | 6/2016 | DiFrancisco |
| 2016/0242493 A1 | 8/2016 | Stillwagon |
| 2016/0374427 A1 | 12/2016 | Zahabian |
| 2017/0042290 A1 | 2/2017 | Hatfield et al. |
| 2017/0049190 A1 | 2/2017 | Maussen |
| 2017/0099906 A1 | 4/2017 | Figueroa |
| 2017/0360143 A1 | 12/2017 | Pratt et al. |
| 2018/0110287 A1* | 4/2018 | Hopkins ............. A43B 23/0245 |
| 2018/0110288 A1 | 4/2018 | Hatfield et al. |
| 2018/0110289 A1 | 4/2018 | Owings et al. |
| 2018/0110292 A1 | 4/2018 | Beers et al. |
| 2018/0110295 A1 | 4/2018 | Dyer et al. |
| 2018/0206588 A1 | 7/2018 | Pratt et al. |
| 2018/0213882 A1 | 8/2018 | Morse |
| 2018/0213890 A1 | 8/2018 | Innocente |
| 2018/0235314 A1 | 8/2018 | Farage |
| 2018/0263332 A1* | 9/2018 | Bruno ................ A43B 13/188 |
| 2018/0295942 A1 | 10/2018 | Drake |
| 2019/0000180 A1* | 1/2019 | Moriyasu ............. A43B 13/16 |

FOREIGN PATENT DOCUMENTS

| | | |
|---|---|---|
| CN | 2052208 U | 2/1990 |
| CN | 2112959 U | 8/1992 |
| CN | 2161101 Y | 4/1994 |
| CN | 2262929 Y | 9/1997 |
| CN | 2268406 Y | 11/1997 |
| CN | 2275814 Y | 3/1998 |
| CN | 2281094 Y | 5/1998 |
| CN | 2384464 Y | 6/2000 |
| CN | 2438353 Y | 7/2001 |
| CN | 2456500 Y | 10/2001 |
| CN | 2482829 Y | 3/2002 |
| CN | 1403041 A | 3/2003 |
| CN | 1565297 A | 1/2005 |
| CN | 2712118 Y | 7/2005 |
| CN | 1720835 A | 1/2006 |
| CN | 2783792 Y | 5/2006 |

(56) References Cited

FOREIGN PATENT DOCUMENTS

| | | |
|---|---|---|
| CN | 2819852 Y | 9/2006 |
| CN | 1278639 C | 10/2006 |
| CN | 1943463 A | 4/2007 |
| CN | 2901950 Y | 5/2007 |
| CN | 201005111 Y | 1/2008 |
| CN | 201157014 Y | 12/2008 |
| CN | 201167619 Y | 12/2008 |
| CN | 101485505 A | 7/2009 |
| CN | 101518380 A | 9/2009 |
| CN | 201426430 Y | 3/2010 |
| CN | 201504620 U | 6/2010 |
| CN | 101500446 B | 1/2011 |
| CN | 201743039 U | 2/2011 |
| CN | 101986920 A | 3/2011 |
| CN | 201831038 U | 5/2011 |
| CN | 102159288 A | 8/2011 |
| CN | 201967803 U | 9/2011 |
| CN | 102256673 A | 11/2011 |
| CN | 202211219 U | 5/2012 |
| CN | 101991227 B | 8/2012 |
| CN | 202819794 U | 3/2013 |
| CN | 203121188 U | 8/2013 |
| CN | 203137220 U | 8/2013 |
| CN | 203841187 U | 9/2014 |
| CN | 203884822 U | 10/2014 |
| CN | 203913577 U | 11/2014 |
| CN | 204070772 U | 1/2015 |
| CN | 104394729 A | 3/2015 |
| CN | 102595952 B | 4/2015 |
| CN | 205040743 U | 2/2016 |
| CN | 105876979 A | 8/2016 |
| CN | 205568021 U | 9/2016 |
| CN | 205658453 U | 10/2016 |
| CN | 205671573 U | 11/2016 |
| CN | 205795015 U | 12/2016 |
| CN | 206025369 U | 3/2017 |
| CN | 107692396 A | 2/2018 |
| CN | 107921318 A | 4/2018 |
| CN | 207544444 U | 6/2018 |
| CN | 207949063 U | 10/2018 |
| DE | 3310988 A1 | 9/1984 |
| DE | 19534249 A1 | 3/1997 |
| DE | 19611797 A1 | 10/1997 |
| DE | 29809404 U1 | 8/1998 |
| DE | 29723911 U1 | 5/1999 |
| DE | 10247163 A1 | 4/2004 |
| DE | 102004005288 A1 | 8/2005 |
| DE | 102009023689 A1 | 12/2010 |
| DE | 102013200701 A1 | 7/2013 |
| DE | 202016001813 U1 | 6/2017 |
| EP | 0570621 A1 | 11/1993 |
| EP | 0548116 B1 | 12/1994 |
| EP | 1059044 A1 | 12/2000 |
| EP | 1440627 A1 | 7/2004 |
| EP | 1593315 B1 | 5/2008 |
| EP | 1952715 A1 | 8/2008 |
| EP | 2173208 B1 | 12/2010 |
| EP | 2277402 A2 | 1/2011 |
| EP | 2490565 A1 | 8/2012 |
| EP | 2036449 B1 | 4/2013 |
| EP | 2818068 A1 | 12/2014 |
| EP | 2848141 A1 | 3/2015 |
| EP | 2937007 A1 | 10/2015 |
| FR | 2994800 A1 | 3/2014 |
| GB | 1154145 A | 6/1969 |
| GB | 1358470 A | 7/1974 |
| GB | 2517399 A | 2/2015 |
| GB | 2533809 A | 7/2016 |
| JP | H0181910 U | 6/1989 |
| JP | 2001149394 A | 6/2001 |
| JP | 2004236860 A | 8/2004 |
| JP | 2006055571 A | 3/2006 |
| JP | 2008206629 A | 9/2008 |
| JP | 2014176633 A | 9/2014 |
| KR | 20090130804 A | 12/2009 |
| KR | 20130119566 A | 11/2013 |
| KR | 101841085 B1 | 3/2018 |
| NL | 1020208 C1 | 9/2003 |
| TW | 585748 B | 5/2004 |
| TW | M275736 U | 9/2005 |
| TW | 200930315 A | 7/2009 |
| TW | 201130440 A | 9/2011 |
| TW | M449484 U | 4/2013 |
| TW | M469778 U | 1/2014 |
| TW | I581730 B | 5/2017 |
| WO | 8808678 A1 | 11/1988 |
| WO | 9737556 A1 | 10/1997 |
| WO | 0076337 A1 | 12/2000 |
| WO | 03039283 A1 | 5/2003 |
| WO | 2005070246 A2 | 8/2005 |
| WO | 2006084185 A1 | 8/2006 |
| WO | 2006138170 A1 | 12/2006 |
| WO | 2007024875 A2 | 3/2007 |
| WO | 2007080205 A1 | 7/2007 |
| WO | 2008115743 A1 | 9/2008 |
| WO | 2008152414 A1 | 12/2008 |
| WO | 2009154350 A1 | 12/2009 |
| WO | 2010048203 A1 | 4/2010 |
| WO | 2010059716 A2 | 5/2010 |
| WO | 2010114993 A1 | 10/2010 |
| WO | 2011004946 A1 | 1/2011 |
| WO | 2011140584 A1 | 11/2011 |
| WO | 2012044974 A1 | 4/2012 |
| WO | 2012168956 A1 | 12/2012 |
| WO | 2013039385 A1 | 3/2013 |
| WO | 2013187288 A1 | 12/2013 |
| WO | 2014033396 A1 | 3/2014 |
| WO | 2014038937 A1 | 3/2014 |
| WO | 2014140443 A1 | 9/2014 |
| WO | 2015002521 A1 | 1/2015 |
| WO | 2015198460 A1 | 12/2015 |
| WO | 2016005696 A1 | 1/2016 |
| WO | 2018092023 A1 | 5/2018 |
| WO | 2018193276 A1 | 10/2018 |

OTHER PUBLICATIONS

KIZIK Design, KIZIK® Shoes Launch Footwear Revolution with Patented Handsfree Technology, https://www.prnewswire.com/news-releases/kizik-shoes-launch-footwear-revolution-with-patented-handsfree-technology-300594838.html, Feb. 7, 2018.

Nike Ease Challenge Winner Announced, Nike News, Apr. 25, 2017, https://news.nike.com/news/nike-ease-challenge-winner-announced (accessed May 2, 2018).

* cited by examiner

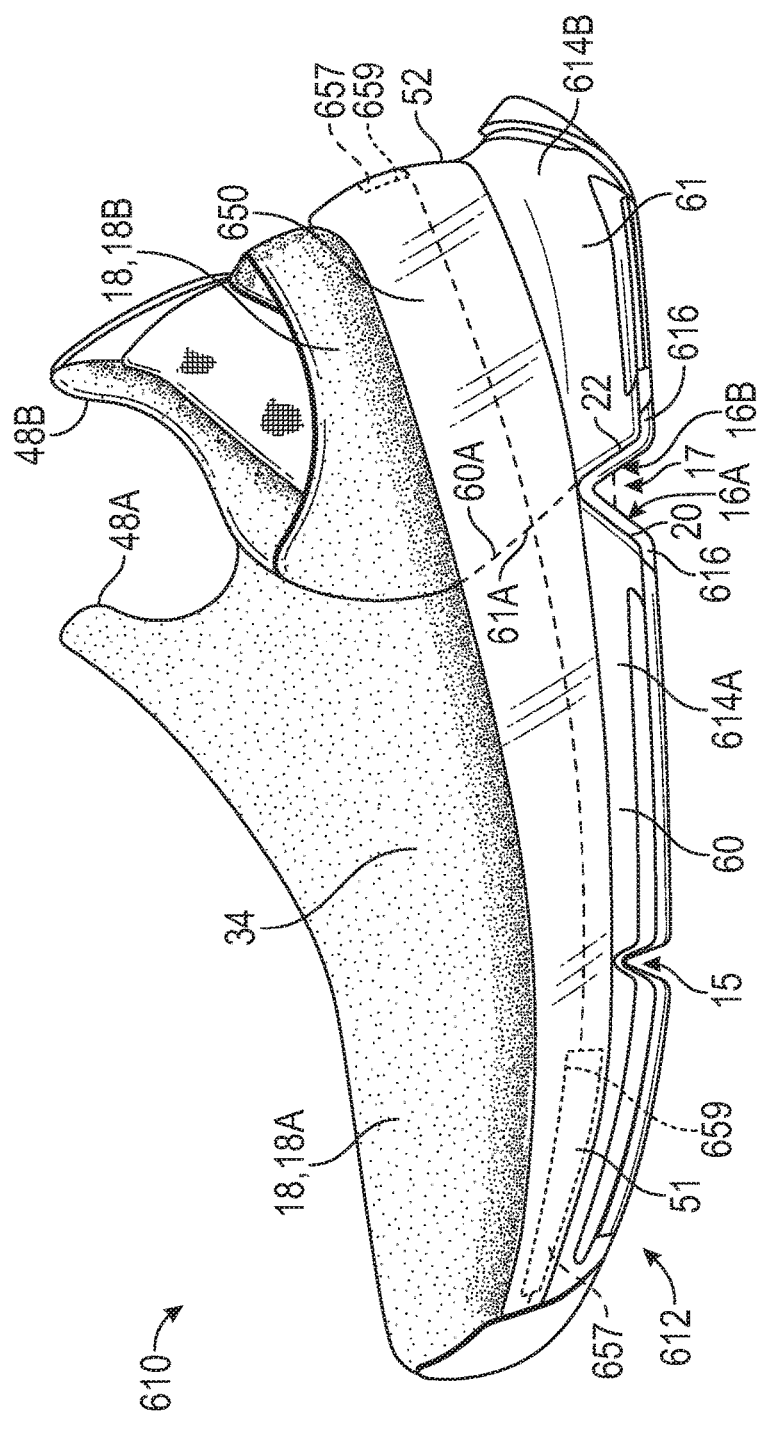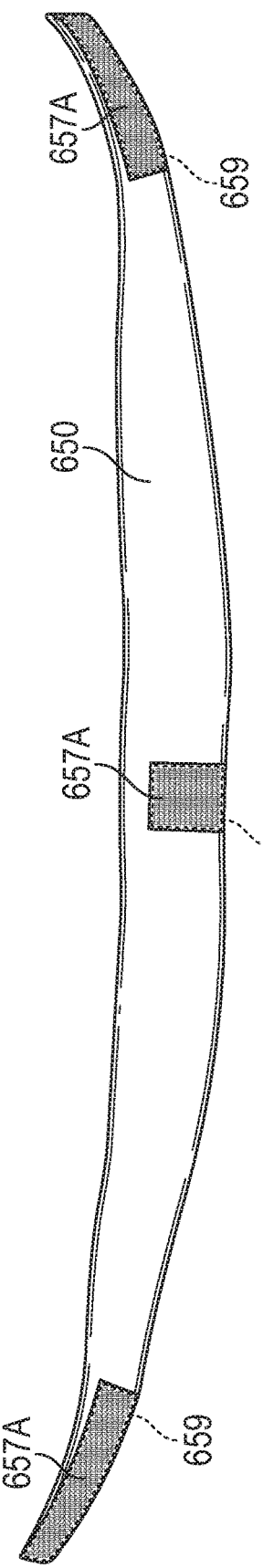

FOOTWEAR WITH JOINTED SOLE STRUCTURE FOR EASE OF ACCESS

CROSS-REFERENCE TO RELATED APPLICATIONS

This application claims the benefit of priority to U.S. Provisional Application No. 62/786,056, filed Dec. 28, 2018, and also claims the benefit of priority to U.S. Provisional Application No. 62/923,049, filed Oct. 18, 2019, both of which are incorporated by reference in their entirety.

TECHNICAL FIELD

The present disclosure generally relates to an article of footwear, and more specifically to an article of footwear with a jointed sole structure for ease of access.

BACKGROUND

Traditionally, placing footwear on a foot often requires the use of one or both hands to stretch the ankle opening of a footwear upper, and hold the rear portion during foot insertion. The fit of the upper is then adjusted following foot insertion, such as by tying laces.

BRIEF DESCRIPTION OF THE DRAWINGS

The drawings described herein are for illustrative purposes only, are schematic in nature, and are intended to be exemplary rather than to limit the scope of the disclosure.

FIG. 23 is a medial side view of an alternative embodiment of an article of footwear with a sole structure in a use position.

FIG. 24 is a plan view of an interior side of an elastic biasing member removed from the article of footwear of FIG. 23.

DESCRIPTION

Figure 1:
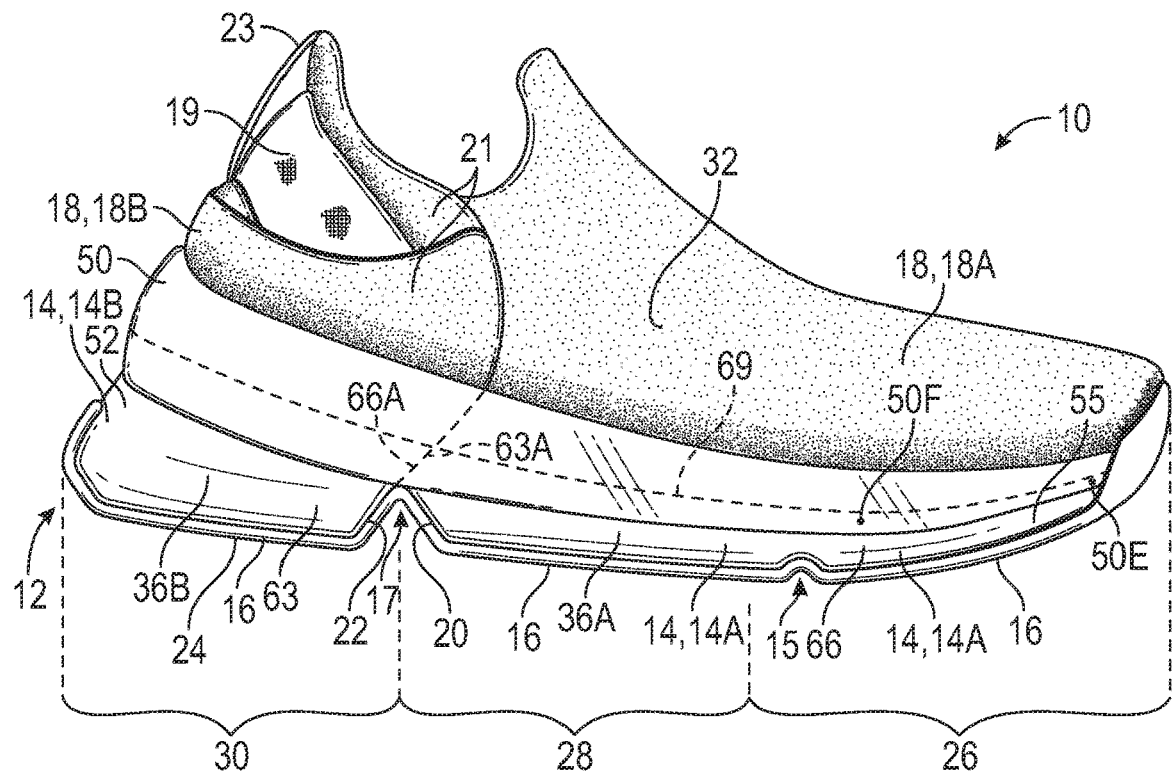
FIG. 1 is a lateral side view of an article of footwear with a sole structure in a use position.

An article of footwear disclosed herein may enable hands-free placement of the article of footwear on a foot by providing a sole structure with separate front and rear midsole components connected to one another by at least one connecting member that defines at least one groove. The connecting member may be, for example, a portion of an outsole that may be formed with the groove, a plate formed with the groove, and/or a textile component such as a textile sheet.

The connecting member particularly functions as a hinge or joint at the groove, and the sole structure is able to pivot (e.g., articulate) at the groove between a first orientation, referred to as a use position in which the groove is relatively open, and a second orientation, referred to as an access position in which the groove is relatively closed.

Confronting surfaces of the connecting member at the groove are closer to one another in the access position than in the use position so that the groove is relatively open in the use position and is relatively closed in the access position.

In some embodiments, separate front and rear upper portions may be secured to the front and rear midsole components.

At least parts of the front and rear upper portions may be further apart from one another in the access position, allowing easier foot entry into the front upper portion, with the rear upper portion then automatically closing around the foot as the footwear returns to the use position under a load of the foot.

The footwear may be made bi-stable in the access and use positions with a biasing member such as an elastic strap that assists entry and withdrawal of the footwear without the use of hands, as well as secures the footwear in the access and use positions. The hands-free operation may be made possible by these and other aspects described herein.

In an example, an article of footwear may comprise a sole structure that may include a front midsole component and a rear midsole component.

A connecting member may connect the front midsole component to the rear midsole component. The connecting member may define at least one groove at a lower side of the sole structure between the front midsole component and the rear midsole component. The front midsole component and the rear midsole component may be pivotable relative to one another at the groove between a use position and an access position. The groove may be relatively open in the use position, and the groove may be relatively closed in the access position.

In one or more implementations, the connecting member may be an outsole lining the rear wall of the front midsole component and the front wall of the rear midsole component in the groove.

Specifically, the rear midsole component may be separate from, not directly connected to, and non-integral with the front midsole component. Such midsole components may also be referred to as divided. Similarly, the article of footwear may include a divided footwear upper having a front upper portion fixed to the front midsole component and a separate rear upper portion fixed to the rear midsole component.

At least parts of the front upper portion and the rear upper portion may be spaced further apart from one another in the access position than in the use position.

In one or more implementations, a side wall of the front midsole component and a side wall of the rear midsole component may substantially confront or be substantially opposed to one another above the groove in the use position. For example, a rear edge of the side wall of the front midsole component and a front edge of the side wall of the rear midsole component may angle forward from the groove in the use position, with the side wall of the rear midsole component extending partially over the side wall of the front midsole component forward of the groove. This particularly provides an area of overlap of the side wall of the rear midsole component and the side wall of the front midsole component in the longitudinal direction of the sole structure. The side wall of the front midsole component particularly confronts the side wall of the rear midsole component forward of the groove in the use position.

In one aspect, a front surface of the side wall of the rear midsole component may be disposed at an acute angle to an exterior side surface of the side wall of the rear midsole component, and/or a rear surface of the side wall of the front midsole component may be disposed at an obtuse angle to an exterior side surface of the side wall of the front midsole component.

Specifically, the front surface of the side wall of the rear midsole component may face the rear surface of the side wall of the front midsole component in the use position. For example, a front surface of the side wall of the rear midsole component may angle rearward from an outer edge of the front surface to an inner edge of the front surface, and a rear surface of the side wall of the front midsole component may angle rearward from an outer edge of the front surface to an inner edge of the front surface. In such configurations, any minor separation between the rear edge of the side wall of the front midsole component and the front edge of the side wall of the rear midsole component in the use position will be less noticeable, as the obtusely-angled rear surface of the side wall of the front midsole component will be directly inward of any such gap, rather than the gap extending straight through the side wall as it might if the front and rear surfaces were orthogonal to the exterior side surfaces of the side walls. Additionally, any moisture will drain outward and downward along the rear surface of the side wall of the front midsole component, forward of the groove.

In an aspect, the front midsole component may include a heel footbed that particularly extends over the groove and overlays the rear midsole component in the use position. The heel footbed may be spaced apart from the rear upper portion in the access position. By extending rearward in this manner, the heel footbed serves as a target for locating the foot in alignment above the rear midsole component to allow the rear upper portion to easily surround the rear of the heel when the footwear is moved to the use position by the weight of the foot.

Further particularly, the front midsole component may extend in a forefoot region, a midfoot region, and/or a heel region of the article of footwear in the use position. For example, the heel footbed may extend in the heel region in the use position. Interfitting features of the midsole components particularly may thus be disposed both forward and rearward of the groove, with the front edge of the side wall of the rear midsole component overlaying the rear edge of the side wall of the front midsole component, while the rearward-extending heel footbed of the front midsole component overlays and locks to the rear midsole component as described herein.

Additionally or alternatively, sides of the front upper portion and the rear upper portion may overlap in the use position, providing greater lateral support where they overlap. For example, the sides may overlap in the transverse direction in the use position in an embodiment in which forward ends of either or both of the medial side and lateral side of the rear upper portion are disposed laterally-inward of rear ends of the medial and lateral sides of the front upper portion, or laterally-outward of rear ends of the medial and lateral sides of the front upper portion.

Furthermore, the heel footbed may include a body, and a plate embedded in or secured to externally to the body. The plate particularly may be relatively more rigid than the body. For example, the plate may have a first rigidity whereas the body has a second rigidity less than the first rigidity. The more rigid plate may enable smoother transitioning between the access and use positions, allowing the footbed to be more easily seated on the rear midsole component and within the rear upper portion.

The more rigid plate may stiffen the rear of the heel footbed, which may prevent twisting of the heel footbed about the longitudinal axis of the heel footbed, enabling it to move more easily past the rear upper portion between the access position and the use position than would a heel footbed without the plate.

The plate may be entirely rearward of the groove in the use position or may extend at least to the groove in the use position.

In one or more configurations, the heel footbed may further comprise an external stiffening layer on a rear of the body. The external stiffening layer may define a rear periphery of the heel footbed. The body may be relatively less hard than the external stiffening layer. For example, the body may have a first hardness and the external stiffening layer may have a second hardness greater than the first hardness.

Specifically, the outer facing surface of the harder external stiffening layer may also have a lower coefficient of friction than the outer facing surface of the body and may enable the heel footbed to move more easily past the rear upper portion between the access position and the use position than would a heel footbed without the external stiffening layer.

Particularly, the external stiffening layer may include at least one tab protruding rearward at the rear periphery. The rear midsole component may include at least one rib that projects forward at a rear of a foot-facing surface of the rear midsole component. The tab(s) may interface with the rib(s) when the sole structure moves from the access position to the use position, the tab being disposed below the rib in the use position.

In one example, the rear midsole component may include at least one body and at least one stiffening component disposed on the body. The stiffening component may be relatively harder than the body and may include the rib(s).

At least one of the rear midsole component or the heel footbed may elastically deform when the tab(s) interface(s) with the rib(s), and resiliently return to a pre-deformed state when the sole structure is in the use position, the rib(s) and the tab(s) locking the sole structure in the use position. The stiffening component may define at least one recess below the rib(s), and the tab(s) may be at least partly disposed in the recess(es) when the sole structure is in the use position, further securing the heel footbed in the use position.

The rear upper portion may have a protrusion that protrudes forward above the heel footbed when the front midsole component and the rear midsole component are in the use position. For example, the protrusion may be compliant (e.g., compressible), and may be shaped to conform to and protect the Achilles of a wearer. Because the protruding tab is of the relatively harder material of the external stiffening layer, the tab may compress the protrusion to move past the protrusion when the sole structure moves from the access position to the use position. The rigidity of the embedded plate particularly may also aid in enabling the heel footbed to compress the protrusion when the sole structure moves from the access position to the use position, allowing the footbed to move past the protrusion.

Additionally or alternatively, the rear upper portion may include an elastic heel band that stretches to substantially conform to the rear of a wearer's foot to ensure a comfortable yet secure fit.

In one or more implementations, the article of footwear may include an elastic biasing member, such as an elastic strap, particularly fixed to a medial side wall and to a lateral side wall of the front midsole component forward of the groove, and/or fixed to the rear midsole component rearward of the groove.

In some implementations, the elastic biasing member may be removably fixed to the medial side wall of the front midsole component at the first location with a first fastener, to the rear midsole component at the second location with a second fastener, and/or to the lateral side wall of the front midsole component at the third location with a third fastener. For example, hook-and-loop fasteners may be used at one or more of the first, second, and third locations, including first fastener portions secured to the front midsole component, and second fastener portions secured to the elastic biasing member and releasably securable to the first fastener portions.

Various components of the sole structure described herein are elastic components, such as the elastic biasing member, e.g., the elastic strap, and the outsole. The elastic component comprises an elastomeric material. The elastomeric material may be a thermoplastic elastomeric material or a thermoset elastomeric material. The elastomeric material may be a foamed elastomeric material, or an unfoamed elastomeric material. In particular examples, due to their greater tensile strength, unfoamed elastomeric materials may be used to form the elastic component(s). The elastomeric material may be a crosslinked rubber material, such as a sulfur or peroxide-cured rubber material.

The elastomeric material includes one or more elastomeric polymer. The one or more elastomeric polymer may include an elastomeric polyurethane, an elastomeric polyester, an elastomeric polyether, an elastomeric polyamide, an elastomeric polyolefin, or any combination thereof. The one or more elastomeric polymer may include a thermoplastic polyurethane (TPU). The one or more elastomeric polymer may include a polyether-polyurea copolymer.

The one or more elastomeric polymer may include a rubber. The rubber may be a natural rubber, or a synthetic rubber, or a combination of both. Examples of types of rubbers include butadiene rubber, styrene-butadiene (SBR) rubber, butyl rubber, isoprene rubber, urethane rubber, nitrile rubber, neoprene rubber, ethylene propylene diene monomer (EPDM) rubber, ethylene-propylene rubber, urethane rubber, polynorbornene rubber, methyl methacrylate butadiene styrene (MBS) rubber, styrene ethylene butylene (SEBS) rubber, silicone rubber, urethane rubber, and mixtures thereof. The rubber compound may be a virgin material, a regrind material, and mixtures thereof.

The elastomeric material may (particularly further) comprise one or more additives independently selected from the group of crosslinking agents, plasticizers, mold release agents, lubricants, antioxidants, flame retardants, dyes, pigments, reinforcing and non-reinforcing fillers, fiber reinforcements, and light stabilizers.

In an aspect, the elastic biasing member may be bi-stable in the use position and the access position. Stated differently, the elastic biasing member may be in tension both when the sole structure is in access position and when the sole structure is in the use position. In the event that the elastic biasing member is secured to both the front midsole component and the rear midsole component, it may increase in tension when the sole structure is between the use position and the access position.

Particularly, the elastic biasing member may be positioned so that longitudinal tensile forces in the elastic biasing member are partially relieved when the footwear is in the use position and are also partially relieved when the footwear is in the access position. Stated differently, the elastic biasing member causes the sole structure to be bi-stable, biasing it to the access and use positions. An applied force, such as the weight of a foot used to move the footwear from one position to the other will be assisted by the elastic biasing member's bias which urges the sole structure to return to one or the other of the access position or the use position as opposed to remaining in an intermediate position.

In one or more implementations, the elastic biasing member may be fixed to the medial side wall of the front midsole component at a first location, to the rear midsole component at a second location, and/or to the lateral side wall of the front midsole component at a third location. The elastic biasing member may be unfixed between the first location and the second location, and between the second location and the third location. This particularly allows the front and rear midsole components to move relative to the unfixed portions of the elastic biasing member when articulating between the access and use positions.

In one or more configurations, a rear edge of a side wall of the front midsole component may be adjacent to a front edge of a side wall of the rear midsole component above the groove when the sole structure is in the use position. The elastic biasing member may cover the rear edge and the front edge when the sole structure is in the use position. In some embodiments, the elastic biasing member may completely cover the rear edge and the front edge when the sole structure is in the use position.

In one example, the sole structure may include an outsole, and the rear midsole component may define a ridge at a rearmost extent of the rear midsole component. The outsole may substantially wrap upward along the rear midsole component and over the ridge. For example, to facilitate hands-free removal of the footwear, the rear midsole component may protrude rearward of the rear upper portion to the ridge, providing a surface for the opposite foot to press downward on as the wearer's heel is lifted out of the footwear. This force particularly may cause the sole structure to move to the access position as the sole structure articulates at the groove, with the rear upper portion slipping off of the foot, allowing foot withdrawal from the front upper portion.

Specifically, the outsole may be a harder material than the rear midsole component, and by wrapping up over the ridge, the outsole reinforces the area around the ridge, increasing the ability to endure the repeated forces of the opposite foot used during removal of the footwear.

In another aspect, the outsole may have a bottom portion secured to a bottom of the rear midsole component, and a rear portion secured to a rear wall of the rear midsole component. The rear portion particularly may be disposed at an obtuse angle to the bottom portion. With this configuration, the bottom portion of the outsole may be a ground-contact surface that contacts a horizontal ground plane in the use position, and the rear portion of the outsole may be the ground-contact surface with the horizontal ground plane in the access position. Such a configuration allows the sole structure to rest only on a forward portion of the front midsole component and the rear portion of the outsole on the rear midsole component in the access position, with the sole structure articulated upward at the groove.

For increased stability, the sole structure particularly may be configured to rest at three areas of the outsole in a tripod arrangement in the access position. More specifically, in addition to resting on a front portion of the outsole secured to the front midsole component forward of the lifted groove, a rear portion of the outsole rearward of the groove may rest on two regions separated by a concavity at the outer surface of the outsole.

The sole structure may include an outsole having a front bottom portion secured to a bottom of the front midsole component, a rear bottom portion secured to a bottom of the rear midsole component, and a rear portion secured to a rear wall of the rear midsole component.

At least one of the rear wall of the rear midsole component and the rear portion of the outsole particularly may have an outer surface with a concavity. Specifically, in the access position, the sole structure may be lifted away from the a horizontal ground plane at the groove and rest on the front bottom portion of the outsole and on the rear portion of the outsole at a medial side of the concavity and at a lateral side of the concavity with the concavity spaced apart from the horizontal ground plane.

Particularly, the connecting member may comprise a textile component, such as a textile sheet. For example, the textile component may line the rear wall of the front midsole component and the front wall of the rear midsole component at the groove.

Further particularly, the connecting member may be connected to the front midsole component and the rear midsole component to line a rear wall of the front midsole component and a front wall of the rear midsole component at the groove. The connecting member particularly may be preformed to define the groove (e.g., the connecting member may form the shape of the groove when it is free-standing, prior to being connected to the front and rear midsole components). For example, the connecting member may be part of a unitary outsole or may be a component of a multi-piece outsole. Thus, the connecting member may comprise the same material as the outsole. Alternatively, the connecting member may be a more rigid material than the outsole, such as a relatively rigid plastic plate.

In an embodiment, the plate may include a front portion connected to the front midsole component and a rear portion connected to the rear midsole component. The connecting member may further comprise a hinge pin extending transversely relative to and hingedly connecting the front portion of the plate to the rear portion of the plate.

In any of the various embodiments of connecting members disclosed herein, the sole structure may also comprise one or more ribs secured at the connecting member in the groove and extending outward into the groove. For example, a front rib may be secured at a front wall of the connecting member in the groove, and a rear rib may be secured at a rear wall of the connecting member in the groove. The ribs particularly may function as bumpers or spacers to prevent the walls of the connecting member from contacting each other in the closed position of the groove (e.g., in the access position of the sole structure) and/or particularly may serve to reinforce the walls of the connecting member.

In an example, an article of footwear may comprise a sole structure including a front midsole component and a separate rear midsole component. A rear wall of the front midsole component and a front wall of the rear midsole component may be juxtaposed.

The sole structure may also include an outsole connecting the front midsole component to the rear midsole component and disposed on the rear wall of the front midsole component and the front wall of the rear midsole component and defining a groove at a lower side of the sole structure between the front midsole component and the rear midsole component.

The article of footwear may further comprise a divided footwear upper including a front upper portion fixed to the front midsole component and a separate rear upper portion fixed to the rear midsole component. The front midsole component and the rear midsole component may be pivotable relative to one another at the groove(s) between a use position and an access position. The outsole may line the rear wall and the front wall.

The front midsole component may include a heel footbed that at least partly extends over the groove and overlays the rear midsole component in the use position. Rear edges of the side walls of the front midsole component and front edges of the side walls of the rear midsole component particularly may angle forward above the groove in the use position, and/or the side walls of the rear midsole component may extend partially over the side walls of the front midsole component forward of the groove.

In one or more configurations, the heel footbed may be spaced apart from the rear upper portion in the access position, extending rearward and upward from the front midsole component.

The rear midsole component may protrude rearward of the rear upper portion to a ridge above the rear wall of the rear midsole component. The outsole substantially may wrap upward along the rear midsole component over the ridge. An elastic strap may be fixed to a medial side wall of the front midsole component at a first location, to the rear midsole component at a second location, and to a lateral side wall of the front midsole component at a third location and unfixed between the first location and the second location, and between the second location and the third location.

A method of manufacturing an article of footwear such as the article of footwear disclosed herein may include providing a connecting member with a front portion, a rear portion, and a transverse groove extending between and separating the front portion and the rear portion. The method may comprise connecting a front midsole component to the front portion of the connecting member and may further comprise connecting a rear midsole component to the rear portion of the connecting member, with the front midsole component pivotable relative to the rear midsole component at the groove.

In an example, the method may further comprise molding the connecting member to form the front portion, the rear portion, and the transverse groove prior to connecting the front midsole component the front portion and the rear midsole component to the rear portion. In such an embodiment, connecting the front midsole component to the front portion of the connecting member and connecting the rear midsole component to the rear portion of the connecting member may be by molding the front midsole component to the front portion of the connecting member and molding the rear midsole component to the rear portion of the connecting member.

The method may further comprise connecting a front portion of an outsole to the front portion midsole component forward of the connecting member. The method may further comprise connecting a rear portion of the outsole to the rear portion of the midsole component rearward of the connecting member.

The connecting member may be an outsole or a portion of an outsole, or may be a plate of a material different from and more rigid than the outsole, and in either case may be pre-formed to define the groove. In an aspect of the method, the connecting member may be a textile component, and providing the connecting member may further comprise connecting a front portion of an outsole to a front portion of a textile component and connecting a rear portion of an outsole to a rear portion of the textile component. The textile component may define the groove. With any of these embodiments of a connecting member, the method may further comprise securing a rib at a wall of the connecting member in the groove.

Particularly, the connecting member, the front midsole component, and the rear midsole component may be adhered to one another.

Further particularly, the connecting member, the front midsole component, and the rear midsole component may be co-molded (e.g., they may connect to one another as a result of co-molding).

Further particularly, connecting the front midsole component to the front portion of the connecting member and connecting the rear midsole component to the rear portion of the connecting member may be by printing the front midsole component to the front portion of the connecting member and printing the rear midsole component to the rear portion of the connecting member. For example, an additive printing process such as three-dimensional (3-D) printing may be used.

The above features and advantages and other features and advantages of the present teachings are readily apparent from the following detailed description of the modes for carrying out the present teachings when taken in connection with the accompanying drawings.

Referring to the drawings, wherein like reference numbers refer to like components throughout the views, FIG. 1 shows an embodiment of an article of footwear 10 (also referred to herein as footwear 10) that includes a sole structure 12 with a midsole 14 having a front midsole component 14A and a rear midsole component 14B that is separate and divided from the front midsole component 14A. Stated differently, the front midsole component 14A particularly is not integrally formed with, is not unitary with, and/or is not directly attached to the rear midsole component 14B. Instead, the front midsole component 14A and the rear midsole component 14B are both attached to at least one connecting member 16, which in the embodiment shown is an outsole 16. The connecting member 16 defines at least one groove 17 at a lower side or ground-engaging side of the sole structure 12 between the front midsole component 14A and the rear midsole component 14B, as further described herein.

In FIG. 1, the groove 17 particularly is configured as substantially having a triangular shape in a cross-section taken along a longitudinal length of the article of footwear 10. In other embodiments, the groove 17 may be more semi-circular, square, or rectangular in cross-section. The groove 17 may have any cross-sectional shape that allows the two midsole components 14A, 14B to pivot relative to one another at the groove 17. The peak of the groove 17 or top of the cross-section through the groove 17 particularly is configured to permit flexing of the material for opening and closing of the groove 17 while minimizing or reducing stress concentrations or fatigue. For example, if a top of the groove 17 particularly extends from the lateral side 32 to the medial side 34 of the sole structure 12, then internal forces resulting from the flexing are spread across the width of the sole structure 12, reducing stress concentrations. Additionally, if the top of the groove 17 particularly has a relatively rounded rather than a relatively pointed shape (e.g., does not have a pointed apex), internal forces are spread over a greater area of the material, reducing stress concentrations in comparison to a pointed groove.

Figure 3:
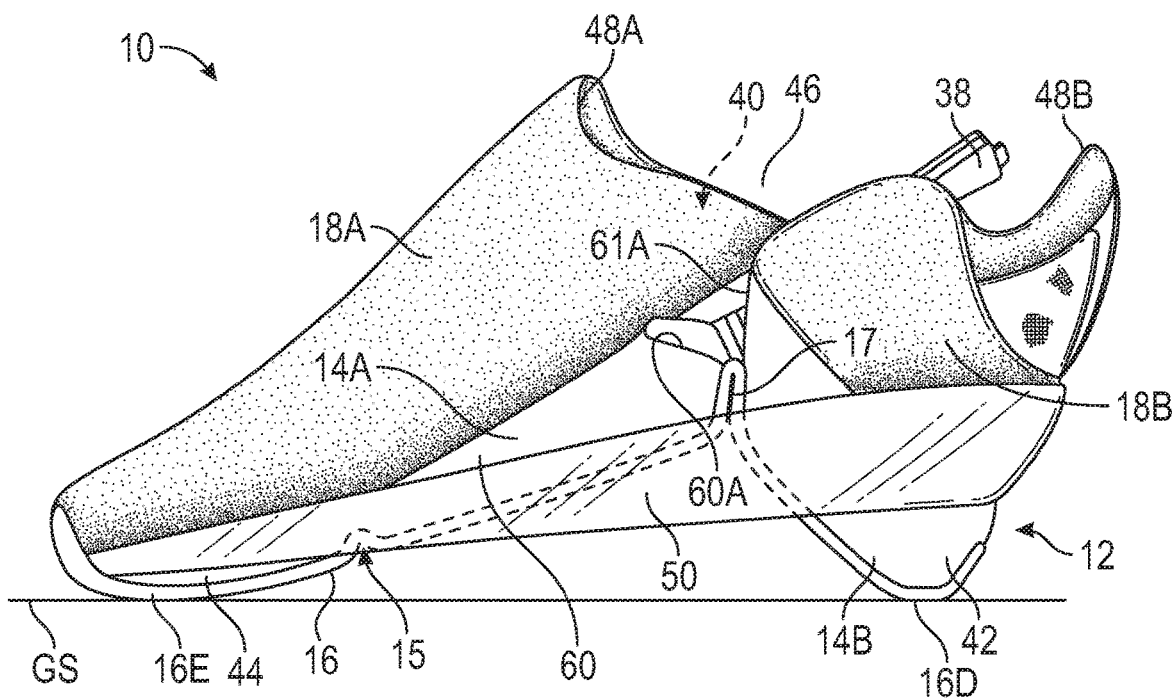
FIG. 3 is a medial side view of the article of footwear of FIG. 1 in an access position.

The article of footwear 10 may also include a divided footwear upper 18 having a front upper portion 18A and a rear upper portion 18B. As discussed herein, these and other features of the article of footwear 10 enable an access position of the footwear (such as shown in FIG. 3) that particularly affords easy, hands-free foot entry into the article of footwear 10. Additionally, the footwear 10 adopts a use position (such as shown in FIG. 1) after foot entry, particularly also in a hands-free manner. The footwear 10 herein is depicted as a leisure shoe or an athletic shoe, but the present teachings are not limited to such, and also encompass dress shoes, work shoes, sandals, slippers, boots, or any other category of footwear.

The front midsole component 14A and the rear midsole component 14B are juxtaposed with a rear wall 20 of the front midsole component 14A and a front wall 22 of the rear midsole component 14B defining an area for the groove 17. The groove 17 particularly is at a lower side 24 of the sole structure 12 and/or is between the front midsole component 14A and the rear midsole component 14B.

The outsole 16 particularly connects the front midsole component 14A to the rear midsole component 14B and/or is disposed on the rear wall 20 of the front midsole component 14A and the front wall 22 of the rear midsole component 14B and further defines the groove 17. For example, the outsole 16 may be secured to the front and rear midsole components 14A, 14B with adhesive, by heat bonding, or otherwise.

The front midsole component 14A includes at least one flex groove 15 in the forefoot region 26. The flex groove 15 is not as deep nor as wide as the groove 17 and is defined by the front midsole component 14A. As shown, the outsole 16 lines a front wall and a rear wall of the front midsole component 14A in the flex groove 15.

The front upper portion 18A of the divided upper 18 particularly is fixed to the front midsole component 14A, and/or the separate rear upper portion 18B particularly is fixed to the rear midsole component 14B.

The rear upper portion 18B may include several different materials. For example, the rear upper portion 18B may include an elastic heel band 19 that stretches to conform to the rear of a wearer's foot to ensure a comfortable yet secure fit. The elastic heel band 19 may be secured by stitching or otherwise at medial and lateral ends to the base layer 21 of the rear upper portion 18B, and a retaining tab 23 may cross over the elastic heel band 19 to help locate it across the rear of the rear upper portion 18B.

The front midsole component 14A and the rear midsole component 14B are pivotable relative to one another at the groove 17 between a use position of FIG. 1 and an access position of FIG. 3. The divided footwear upper 18 particularly helps to facilitate pivoting of the footwear 10 at the groove 17 and/or hands-free foot entry. The upper 18 is referred to as divided because the front upper portion 18A and the rear upper portion 18B are separate, discreet upper components that are not physically connected to one another. As such, they do not interfere with one another when the footwear 10 moves from the access position to the use position, or from the use position to the access position. Alternatively, the front upper portion 18A and the rear upper portion 18B may be portions of a single, unitary, undivided upper. For example, the upper 18 may include gussets, folds, pleats, relatively elastic portions or the like extending between and connecting the front upper portion 18A and the rear upper portion 18B as a single, unitary upper while still allowing the upper 18 to widen at the ankle opening 46 to the access position.

Specifically, as shown in FIG. 1, the groove 17 is relatively open and/or the front upper portion 18A and the rear upper portion 18B are adjacent to one another in the use position. As shown in FIG. 3, the groove 17 is relatively closed and at least parts of the front upper portion 18A and the rear upper portion 18B are spaced further apart from one another in the access position than in the use position.

Confronting surfaces of the connecting member 16 at the groove(s) 17 (e.g., the exterior surface 16B of the portion of the outsole 16 on the front wall 22 of the rear midsole component 14B and the exterior surface 16A of the portion of the outsole 16 on the rear wall 20 of the front midsole component 14A) are closer to one another in the access position (see FIG. 6) than in the use position (see FIG. 2) so that the groove 17 is relatively open in the use position, and the groove 17 is relatively closed in the access position.

Specifically, in the access position, when the groove 17 is relatively closed, the sole structure 12 particularly rests only on the front portion 16E and the rear portion 16D of the outsole 16 as in FIG. 3, and/or the exterior surface 16A of the portion of the outsole 16 on the rear wall 20 of the front midsole component 14A is in contact with the exterior surface 16B of the portion of the outsole 16 on the front wall 22 of the rear midsole component 14B, or is at least closer to the exterior surface 16B than in the use position.

The exterior surfaces 16A, 16B may touch in the access position (see FIG. 6) to provide a stop (e.g., prevent further rotation or pivotal movement toward one another), but the exterior surfaces 16A, 16B need not necessarily touch in the access position. The groove 17 is relatively open when the heel footbed 38 overlays and contacts the rear midsole component 14B, as discussed herein.

Figure 4:
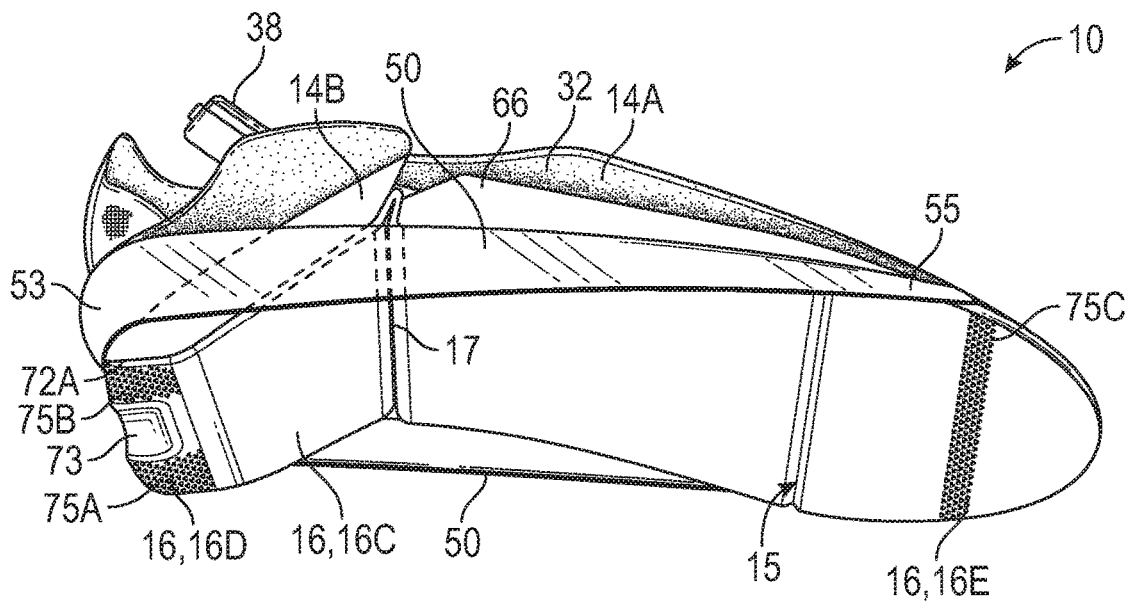
FIG. 4 is a bottom perspective view of the article of footwear of FIG. 1.
Figure 5:
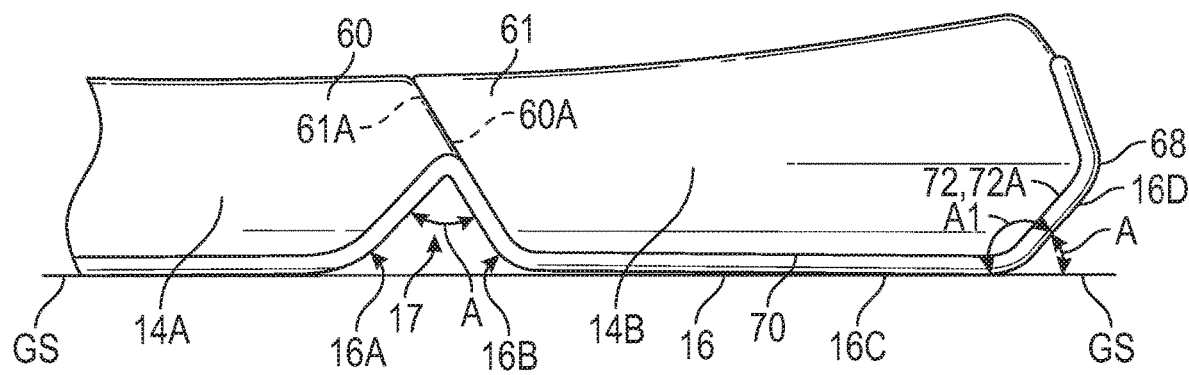
FIG. 5 is a fragmentary medial side view of the sole structure of FIG. 1 in the use position.

The outsole 16 may be pre-formed with the groove(s) 17 in the open position of FIG. 5. Stated differently, the outsole 16 may be molded with the groove(s) 17. The front and rear midsole components 14A, 14B may be separately molded, trimmed, or otherwise manufactured with the shapes shown in FIGS. 1-5 or may be molded as a single component that is subsequently cut into two separate components. The front and rear midsole components 14A, 14B may then be adhered to the outsole 16 with the pre-formed groove(s) 17.

With reference to FIG. 1, the footwear 10 has three general regions: a forefoot region 26, a midfoot region 28, and a heel region 30 which are also the forefoot region, the midfoot region, and the heel region, respectively, of the sole structure 12 and the upper 18. The footwear 10 also includes a lateral side 32 and a medial side 34 (best shown in FIG. 2) opposite to the lateral side 32. The forefoot region 26 generally includes portions of the article of footwear 10 corresponding with the toes and the joints connecting the metatarsals with the phalanges of a wearer's foot. The midfoot region 28 generally includes portions of the article of footwear 10 corresponding with the arch area of the foot, and/or the heel region 30 corresponds with rear portions of the foot, including the calcaneus bone. The lateral side 32 and medial side 34 extend through each of forefoot region 26, the midfoot region 28, and the heel region 30 and correspond with opposite sides of the article of footwear 10. The forefoot region 26, the midfoot region 28, the heel region 30, the lateral side 32 and the medial side 34 are not intended to demarcate precise areas of footwear 10 but are instead intended to represent general areas of footwear 10 to aid in the following discussion.

The front midsole component 14A may include a body 36A and the rear midsole component 14B may include a separate body 36B. The bodies 36A, 36B may comprise, for example, an elastomeric foam such as a polyurethane or ethylvinylacetate foam to attenuate ground reaction forces (i.e., provide cushioning) when compressed between the foot and the ground during walking, running, or other ambulatory activities. In further configurations, either or both of the front midsole component 14A and the rear midsole component 14B may incorporate fluid-filled chambers, plates, moderators, or other elements that further attenuate forces, enhance stability, or influence the motions of the foot.

In the embodiment shown, the foam of the cushioning layer (e.g., the bodies 36A, 36B) may include a foamed polymeric material and may be at least partially a polyurethane (PU) foam, a polyurethane ethylene-vinyl acetate (EVA) foam, and may include heat-expanded and molded EVA foam pellets.

The foamed polymeric material includes one or more polymers. The one or more polymers may include an elastomer, including a thermoplastic elastomer (TPE). The one or more polymers may include aliphatic polymers, aromatic polymers, or mixture of both. In one example, the one or more polymers may include homopolymers, copolymers (including terpolymers), or mixtures of both. The copolymers may be random copolymers, block copolymers, alternating copolymers, periodic copolymers, or graft copolymers, for instance. The one or more polymers may include olefinic homopolymers or copolymers or a mixture of olefinic homopolymers and copolymers. Examples of olefinic polymers include polyethylene (PE) and polypropylene (PP). For example, the PE may be a PE homopolymer such as a low density PE or a high density PE, a low molecular weight PE or an ultra-high molecular weight PE, a linear PE or a branched chain PE, etc. The PE may be an ethylene copolymer such as, for example, an ethylene-vinyl acetate (EVA) copolymer, an ethylene-vinyl alcohol (EVOH) copolymer, an ethylene-ethyl acrylate copolymer, an ethylene-unsaturated mono-fatty acid copolymer, etc. The one or more polymers may include a polyacrylate such as a polyacrylic acid, an ester of a polyacrylic acid, a polyacrylonitrile, a polyacrylic acetate, a polymethyl acrylate, a polyethyl acrylate, a polybutyl acrylate, a polymethyl methacrylate, a polyvinyl acetate, etc., including derivatives thereof, copolymers thereof, and any mixture thereof, in one example. The one or more polymers may include an ionomeric polymer. The ionomeric polymer may be a polycarboxylic acid or a derivative of a polycarboxylic acid, for instance. The ionomeric polymer may be a sodium salt, a magnesium salt, a potassium salt, or a salt of another metallic ion. The ionomeric polymer may be a fatty acid modified ionomeric polymer. Examples of ionomeric polymers include polystyrene sulfonate, and ethylene-methacrylic acid copolymers. The one or more polymers may include a polycarbonate. The one or more polymers may include a fluoropolymer. The one or more polymers may include a polysiloxane. The one or more polymers may include a vinyl polymer such as polyvinyl chloride (PVC), polyvinyl acetate, polyvinyl alcohol, etc. The one or more polymers may include a polystyrene. The polystyrene may be a styrene copolymer such as, for example, an acrylonitrile butadiene styrene (ABS), a styrene acrylonitrile (SAN), a styrene ethylene butylene styrene (SEBS), a styrene ethylene propylene styrene (SEPS), a styrene butadiene styrene (SBS), etc. The one or more polymers may include a polyamide (PA). The PA may be a PA 6, PA 66, PA 11, or a copolymer thereof. The polyester may be an aliphatic polyester homopolymer or copolymer such as polyglycolic acid, polylactic acid, polycaprolactone, polyhydroxybutyrate, and the like. The polyester may be a semi-aromatic copolymer such as polyethylene terephthalate (PET) or polybutylene terephthalate (PBT). The one or more polymers may include a polyether such as a polyethylene glycol or polypropylene glycol, including copolymers thereof. The one or more polymers may include a polyurethane, including an aromatic polyurethane derived from an aromatic isocyanate such as diphenylmethane diisocyanate (MDI) or toluene diisocyanate (TDI), or an aliphatic polyurethane derived from an aliphatic isocyanate such as hexamethylene diisocyanate (HDI) or isophone diisocyanate (IPDI), or a mixture of both an aromatic polyurethane and an aliphatic polyurethane.

The foamed polymeric material may be a chemically foamed polymeric material, which is foamed using a chemical blowing agent that forms a gas when heated. For example, the chemical blowing agent can be an azo compound such as adodicarbonamide, sodium bicarbonate, or an isocyanate. Alternatively or additionally, the foamed polymeric material may be a physically foamed polymeric material, which is foamed using a physical blowing agent which changes phase from a liquid or a supercritical fluid to a gas due to changes in temperature and/or pressure.

Optionally, in addition to the one or more polymers, the polymeric material may further include one or more fillers such as glass fiber, powdered glass, modified or natural silica, calcium carbonate, mica, paper, wood chips, modified or natural clays, modified or unmodified synthetic clays, talc, etc. Similarly, the polymeric material optionally may further include one or more colorants, such as pigments or dyes. Other optional components of the polymeric material include processing aids, ultra-violet light absorbers, and the like.

The foamed polymeric material may be a crosslinked foamed polymeric material, i.e., a foamed material in which covalent crosslinking bonds exist between at least a portion of the one or more polymers. A crosslinked foamed polymeric material can be formed by including a crosslinking agent in the polymeric material used to form the foam. The crosslinking agent can be a peroxide-based crosslinking agent such as dicumyl peroxide. Alternatively, the foamed polymeric material can be an uncrosslinked foamed polymeric material which has thermoplastic properties. The foamed polymeric material may be an elastomeric foamed material.

Figure 10:
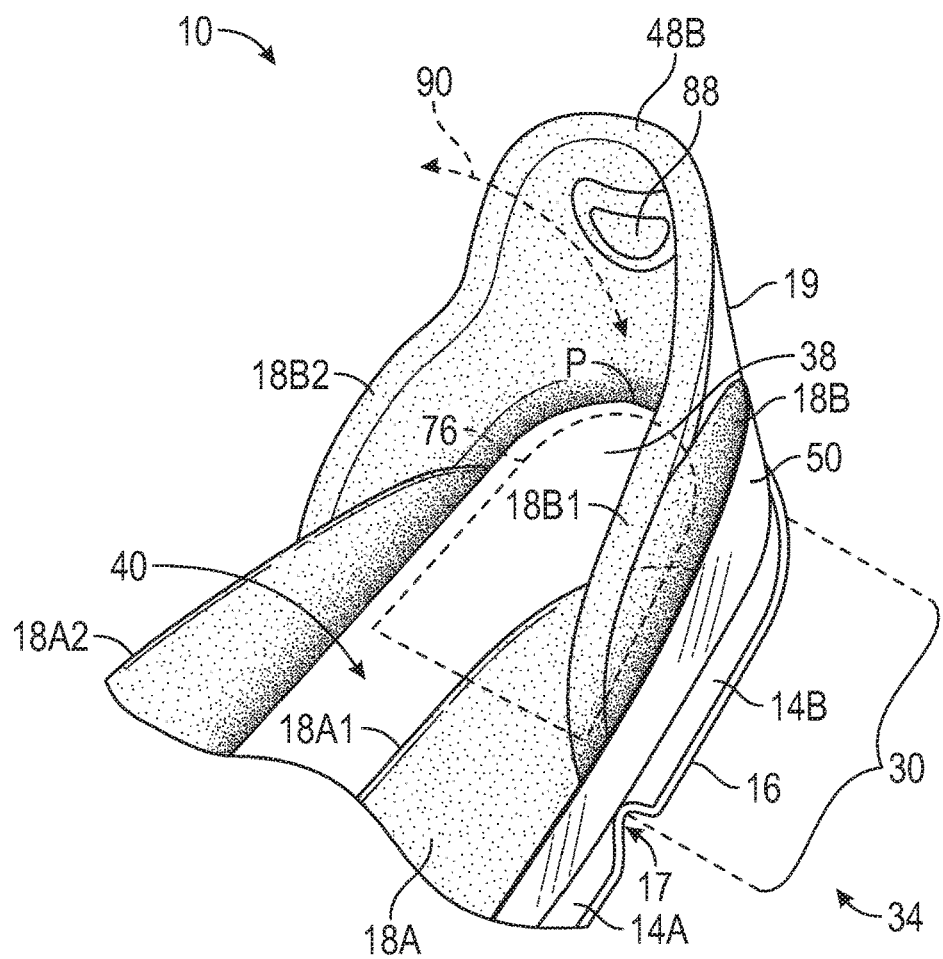
FIG. 10 is a fragmentary perspective view of the article of footwear of FIG. 1 in the use position, showing the heel footbed moved past a protrusion of a rear upper portion.

The front midsole component 14A extends in the forefoot region 26 and the midfoot region 28, and/or particularly includes a heel footbed 38 (see, e.g., FIGS. 3 and 4) that extends in the heel region 30. Accordingly, the front midsole component 14A particularly is a full-length midsole component. In other embodiments, there may be no heel footbed 38, or there may be a footbed portion extending rearward over the groove 17 that does not extend fully to the heel region 30. As shown in FIG. 10, the heel footbed 38 extends the full width between the medial and lateral sides 18B1 and 18B2 of the rear upper portion 18B. In other embodiments, the heel footbed 38 need not extend the full width.

The heel footbed 38 particularly is an integral portion of the front midsole component 14A. Stated differently, the front midsole component 14A, including the heel footbed 38, may be a one-piece component, e.g. formed by injection molding or otherwise. In contrast, the rear midsole component 14B particularly is not a full-length midsole component, as it extends in the heel region, but does not extend in the forefoot region 26, and/or extends only slightly, if at all, in the midfoot region 28. The rear midsole component 14B particularly extends mainly rearward of the groove 17 in the heel region 30 and includes side walls that extend forward of the groove 17, as further discussed herein.

As shown, the groove 17 is at a boundary between the heel region 30 and the midfoot region 28, so that a portion of the side walls that extend forward of the groove 17 in the use position may be in the midfoot region 28, but the rear midsole component 14B is mainly in the heel region 30.

The front and rear midsole components 14A, 14B are selectively pivotable relative to one another at the groove 17. For example, FIG. 1 shows the footwear 10 in a first orientation, also referred to as the use position, and FIG. 3 shows the footwear 10 in a second orientation, also referred to as the access position. The groove 17 is wider in the first orientation than in the second orientation.

Figure 2:
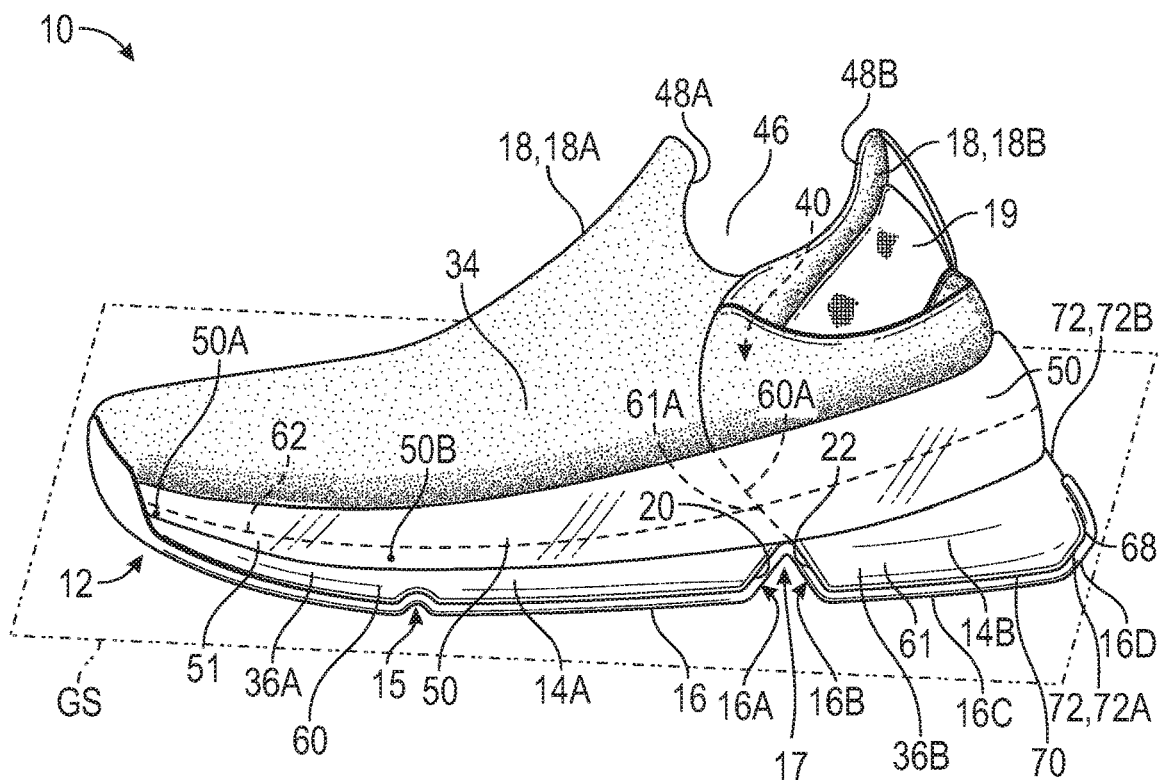
FIG. 2 is a medial side view of the article of footwear of FIG. 1 with the sole structure in the use position.

For example, as shown in FIG. 2, the groove 17 is relatively open when the footwear 10 is in the use position, with an exterior surface 16A of the portion of the outsole 16 on the rear wall 20 of the front midsole component 14A spaced apart from and not in contact with an exterior surface 16B of the portion of the outsole 16 on the front wall 22 of the rear midsole component 14B.

When the footwear 10 is in the access position of FIG. 3, the groove 17 is relatively closed, as the exterior surface 16A of the portion of the outsole 16 on the rear wall 20 of the front midsole component 14A substantially is in contact with the exterior surface 16B of the portion of the outsole 16 on the front wall 22 of the rear midsole component 14B, or is at least closer to the exterior surface 16B than in the use position.

As illustrated in FIG. 2, in the use position, the front midsole component 14A and the rear midsole component 14B particularly are generally coplanar in a plane parallel to the plane shown in phantom representing the ground surface GS and together form a footbed.

In the access position of FIG. 3, a portion of the sole structure 12 particularly is lifted away from the ground surface GS at the groove 17 relative to the use position so that the rear midsole component 14B inclines from a rear end 42 of the rear midsole component 14B to the closed groove 17, and the front midsole component 14A inclines from a forward end 44 of the front midsole component 14A to the closed groove 17.

The front upper portion 18A and the rear upper portion 18B particularly define an ankle opening 46 that leads into the foot-receiving cavity 40 in which a wearer's foot is supported on the sole structure 12 and secured within the upper 18 during use of the footwear 10. In the use position, the size of the ankle opening 46 is determined by the position of a terminal edge 48A of the front upper portion 18A and a terminal edge 48B of the rear upper portion 18B.

In the access position of FIG. 3, at least parts of the front upper portion 18A and the rear upper portion 18B are further apart from one another, opening the ankle opening 46 wider than in the use position, allowing easier access to the foot-receiving cavity 40 from a rear direction. More specifically, the terminal edge 48A of the front upper portion 18A and the terminal edge 48B of the rear upper portion 18B that define the ankle opening 46 are further apart from one another.

Specifically, due to the incline of the front upper portion 18A presented in the access position, with the rear upper portion 18B disposed below the entry angle for the front upper portion 18A, a foot can slide forward into the foot-receiving cavity 40 at the front upper portion 18A with the toes entering at a downward and forward trajectory, using the heel footbed 38 as a guide, and particularly without a need to stretch, open, shift, or otherwise displace any portion of the footwear 10.

When the foot is inserted into the front upper portion 18A and particularly weight is placed on the front midsole component 14A, the front midsole component 14A is urged to return to the use position, and the rear midsole component 14B also returns to the use position, causing the rear upper portion 18B to substantially surround a rear portion of the foot, capturing the foot within the foot-receiving cavity 40.

As is clear in FIG. 2, the front and rear terminal edges 48A, 48B are configured to extend relatively high on the front and rear of the ankle area when a foot is inserted in the foot-receiving cavity 40. Configuring the upper portions 18A, 18B to wrap high on the ankle in this manner can help to prevent withdrawal of the foot when the sole structure 12 is not in the access position. Use of relatively stiff materials for the upper portions 18A, 18B near the ankle opening 46 particularly helps to prevent foot withdrawal except when the sole structure 12 is in the access position.

As best shown in FIG. 10, the heel footbed 38 extends over the groove 17 and/or overlays the rear midsole component 14B in the use position. The heel footbed 38 particularly is an integral part of the front midsole component 14A, disposed inward of side walls 60, 66 of the front upper portion 18A and/or extending rearward beyond the side walls 60, 66. The heel footbed 38 particularly is spaced apart from the rear upper portion 18B in the access position of FIG. 3, extending rearward and upward from a forward portion of the front midsole component 14A. By extending rearward in this manner, the heel footbed 38 is exposed and serves as a target for locating the foot in alignment above the rear midsole component 14B to allow the rear upper portion 18B to easily surround the rear of the heel when the footwear 10 is moved to the use position by the weight of the foot.

Additionally, the upper edge of the rear upper portion 18B and the heel footbed 38 may be at generally the same height when the sole structure 12 is in the access position, as in FIG. 3, which may help to prevent a user from inadvertently inserting their foot between the heel footbed 38 and the rear upper portion 18B.

At least one elastic biasing member 50 extends along the lateral side 32 (FIG. 1), the medial side 34 (FIG. 2) of the article of footwear 10 and/or around a rear periphery 52 of the rear midsole component 14B. The elastic biasing member 50 can be any resiliently stretchable material, such as rubber or elastic nylon. The elastic biasing member 50 is shown configured as a flat elastic strap but could alternatively be configured as a rounded cord or otherwise.

Specifically, the elastic biasing member 50 is secured to the front midsole component 14A forward of the groove 17 both at the lateral side 32 and the medial side 34 and is also secured to the rear midsole component 14B. More specifically, the elastic biasing member 50 is fixed to a medial side wall 60 of the front midsole component 14A at a first location 51 shown in FIG. 2. The first location 51 particularly may extend from point 50A to point 50B along the medial side wall 60 in FIG. 2.

The medial side wall 60 extends from the outsole 16 to an upper edge 62, shown with dashed lines in FIG. 2 as it is covered by the elastic biasing member 50 in the use position of the footwear 10.

Figure 14:
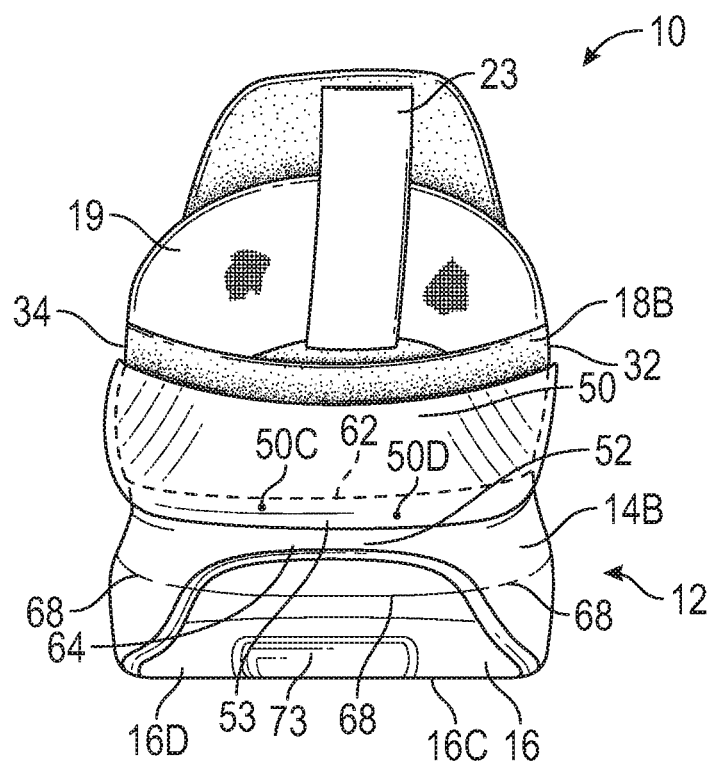
FIG. 14 is a rear view of the article of footwear of FIG. 1 in the use position.

The elastic biasing member 50 particularly is fixed to the rear midsole component 14B at a second location 53 best shown in FIG. 14. The second location 53 may extend from point 50C to point 50D substantially along a rear 64 of the rear midsole component 14B, as shown in FIG. 14.

The elastic biasing member 50 particularly is (also) fixed to the lateral side wall 66 of the front midsole component 14A at a third location 55 shown in FIG. 1. The third location 55 may extend from point 50E to point 50F along the lateral side wall 66 in FIG. 1.

The lateral side wall 66 extends from the outsole 16 to an upper edge 69, shown with dashed lines in FIG. 1 as the upper edge 69 is covered by the elastic biasing member 50 in the use position of the footwear 10. The elastic biasing member 50 particularly may cover a lower extent of the front upper portion 18A, and a lower extent of the rear upper portion 18B in the use position. The elastic biasing member 50 may be unfixed between the first location 51 and the second location 53 and/or unfixed between the second location 53 and the third location 55. This allows the front and rear midsole components 14A, 14B to move relative to the unfixed portions of the elastic biasing member 50 when articulating between the access and use positions. It is apparent by a comparison of FIGS. 1 and 2 to FIGS. 3 and 4, for example, that the elastic biasing member 50 is unfixed between the first location 51 and the second location 53 and is also unfixed between the second location 53 and the third location 55.

As shown in FIGS. 1 and 2, the elastic biasing member 50 particularly covers only an upper extent of the side walls 60 and 66, and/or only an upper extent of the rear 64. In the embodiment shown, in the use position, the elastic biasing member 50 covers a rear edge 66A of the lateral side wall 66 of the front midsole component 14A and a front edge 63A of the lateral side wall 63 of the rear midsole component, and/or a rear edge 60A of the medial side wall 60 of the front midsole component 14A, and a front edge 61A of the medial side wall 61 of the rear midsole component 14B.

Specifically, the elastic biasing member 50 completely covers the rear edge 66A, the front edge 63A, the rear edge 60A, and the front edge 61A in the embodiment shown. By covering the adjacent edges 66A, 63A at the lateral side 32, and the adjacent edges 60A, 61A at the medial side 34, the biasing member 50 acts as a barrier to prevent dirt, debris, and moisture from entering between the front and rear midsole components 14A, 14B at the edges.

The elastic biasing member 50 particularly is of a length such that it is in tension when in the use position in order to keep the front and rear upper portions 18A, 18B contiguous with one another over the groove 17 during wear. The length of the elastic biasing member 50 is such that it is also in tension when the footwear 10 is in the access position of FIG. 3, in order to maintain the footwear 10 in the access position, ready for foot entry.

Specifically, the tension of the elastic biasing member 50 particularly increases as the elastic biasing member 50 is stretched in length as the footwear 10 is moved from the access position to the use position, or from the use position to the access position, particularly making the footwear 10 bi-stable in the use position and the access position. In such a configuration, longitudinal tensile forces in the elastic biasing member 50 are partially relieved when the footwear is in the use position or in the access position. Stated differently, the elastic biasing member 50 particularly causes the sole structure 12 to be bi-stable, biasing it to the access and use positions. An applied force, such as the weight of a foot used to move the footwear 10 from one position to the other will be assisted by the elastic biasing member's 50 bias to remain in one or the other of the two positions as opposed to an intermediate position between the use position and the access position.

A force to stretch the elastic biasing member 50 must be applied to particularly overcome the internal bias of the elastic biasing member 50 in order to transition from the access position to the use position, or from the use position to the access position. The amount of force necessary to move the sole structure 12 from the access position to the use position particularly is dictated in part by the weight of the article of footwear 10, the friction of the foot moving against the footwear 10 as it is inserted, and/or the friction between the outsole 16 and the ground (e.g., at the horizontal ground plane GS).

Specifically, the force may be applied by an incoming foot received in the foot-receiving cavity 40 of the front upper portion 18A when the footwear 10 is in the access position, and the increased force necessary to stretch the elastic biasing member 50 to move to the use position is supplied by the wearer's foot, which loads the footwear 10 (e.g., places weight on the front midsole component 14A, including the heel footbed 38), so that the elastic biasing member 50 is stretched during a transition from the access position to the use position.

With reference to FIG. 2, the rear midsole component 14B defines a ridge 68 particularly at a rearmost extent of the rear midsole component 14B. Specifically, the ridge 68 is defined between a bottom portion 72A of a rear wall 72 of the rear midsole component 14B and a top portion 72B of the rear wall, as the bottom portion 72A slopes upward and outward and the top portion 72B slopes downward and outward, defining the ridge 68 where it meets the bottom portion 72A. The outsole 16 wraps upward from a bottom wall 70 of the rear midsole component 14B, then along the bottom portion 72A of the rear wall 72, and/or over the ridge 68 onto the top portion 72B of the rear wall 72.

To facilitate hands-free removal of the footwear 10, in the use position, the rear midsole component 14B particularly protrudes rearward of the rear upper portion 18B to the ridge 68, providing the top portion 72B of the rear wall 72 as an angled surface on which the opposite foot can press downward as the heel is lifted. This causes the sole structure 12 to articulate at the groove 17, moving to the access position, with the rear upper portion 18B moving downward and away from the heel of the foot, allowing hands-free foot withdrawal from the foot-receiving cavity 40 of the front upper portion 18A.

The outsole 16 particularly may be a harder material than the rear midsole component 14B, such as a natural or synthetic rubber or composite including rubber, with a hardness greater than the hardness of the body 36B of the rear midsole component 14B. Alternatively, the outsole 16 may be natural or synthetic leather or another material. Hardness may be measured according to any suitable scale for measuring the durometer hardness of foams and rubber, such as a Shore A or Shore D scale, and according to any associated durometer test method.

Specifically, by wrapping up over the ridge 68, the outsole 16 reinforces the area around the ridge 68, increasing the ability to endure the repeated forces of the opposite foot used during removal of the footwear 10. Fatigue life and environmental testing may be used to select appropriate materials for the outsole 16. The ability of the outsole 16 to bond to the midsole components 14A, 14B may also be considered in selecting materials for the outsole 16.

FIGS. 1 and 2 show that rear edges 60A, 66A of the respective side walls 60, 66 of the front midsole component 14A and front edges 61A, 63A of the respective medial and lateral side walls 61, 63 of the rear midsole component 14B angle forward substantially above the groove 17 in the use position. This causes the side walls 61, 63 of the rear midsole component 14B to extend partially over the side walls 60, 66, respectively, of the front midsole component 14A forward of the groove 17.

Interfitting features of the midsole components 14A, 14B particularly are thus disposed both forward and rearward of the groove 17: the side walls 61, 63 of the rear midsole component 14B overlaying the side walls 60, 66 of the front midsole component 14A forward of the groove, and the rearward-extending heel footbed 38 of the front midsole component 14A overlaying the rear midsole component 14B rearward of the groove 17.

FIG. 4 shows the bottom of the outsole, including the rear portion 16D that serves as part of the ground contact surface in the access position. The groove 17 is shown substantially closed, and the midsole components 14A, 14B have moved relative to the unfixed portions of the elastic biasing member 50 from the use position. The second and third fixed locations 53 and 55 of the elastic biasing member 50 are shown in FIG. 4.

The bottom portion 16C of the outsole 16 is a ground-contact surface with a horizontal ground plane GS in the use position, and/or the rear portion 16D of the outsole 16 is a ground-contact surface with the horizontal ground plane GS in the access position. Due to inherent manufacturing tolerances when molding a foam midsole or a polymeric outsole it is difficult to ensure that an outer surface of an outsole will be perfectly flat when secured to the midsole. In the access position of the present embodiments, a convex outsole at the rear of the sole structure could create instability in the access position (e.g., may cause the sole structure to tip sideways). Accordingly, instead of attempting to achieve a flat design, the outer surface of the rear portion 16D particularly has a concavity 73 and/or the outsole 16 is spaced apart from the horizontal ground plane at the concavity 73 in the access position so that the ground-contact surface of the rear portion 16D particularly includes a medial region 75A at a medial side of the concavity 73 and/or a lateral region 75B at a lateral side of the concavity 73.

Specifically, these two spaced apart areas in addition to a front region 75C of the front portion 16E of the outsole 16 (see FIG. 3) that form the ground contact surface in the access position are indicated with shading in FIG. 4 and/or form a tripod arrangement to stabilize the sole structure 12 in the access position. The concavity 73 particularly ensures that contact areas in the rear are near the medial and lateral sides rather than only at a portion of the middle as could occur with a convex outsole at the rear portion 16D. The concavity 73 may be molded into the rear portion 16D and/or may result from a concavity in the rear midsole component 14B to which the rear portion 16D is secured and lines.

With reference to FIG. 5, the bottom portion 16C of the outsole 16 particularly is secured to a bottom wall 70 of the rear midsole component 14B, and/or the rear portion 16D of the outsole 16 particularly is secured to the rear wall 72 of the rear midsole component 14B. The rear portion 16D is disposed at an obtuse angle A1 to the bottom portion 16C.

Specifically, an angle A from the ground plane GS to the rear portion 16D of the outsole 16 may be equal to or approximately equal to the angle A between the exterior surfaces 16A, 16B of the outsole portions lining the open groove 17. With this configuration, the bottom portion 16C of the outsole 16 particularly is a ground-contact surface with a horizontal ground plane GS in the use position, and/or the rear portion 16D of the outsole particularly is a ground-contact surface with the horizontal ground plane GS in the access position. Such a configuration allows the sole structure 12 specifically to rest only on a front portion 16E of the outsole 16 on the front midsole component 14A and the rear portion 16D of the outsole 16 (at the medial region 75A and the lateral region 75B) on the rear midsole component 14B in the access position, with the sole structure 12 articulated upward at the groove 17, as shown in FIG. 3.

In FIG. 5, the elastic biasing member 50 is not shown so that the angling of the medial side walls 60, 61 of the front and rear midsole components 14A, 14B in the use position is more easily shown. The medial side wall 60 of the front midsole component 14A and the medial side wall 61 of the rear midsole component 14B are shown confronting one another above and forward of the groove 17 in the use position.

Specifically, the rear edge 60A of the medial side wall 60 and the front edge 61A of the medial side wall 61 angle forward from the groove 17 in the use position. Due to this angling, the medial side wall 61 of the rear midsole component 14B extends partially over the side wall 60 of the front midsole component 14A forward of the groove 17. This particularly provides an area of overlap of the medial side wall 61 of the rear midsole component 14B and the medial side wall 60 of the front midsole component 14A in the longitudinal direction of the sole structure 12. The same is true of the lateral side walls 63, 66 shown in FIG. 1. The lateral side wall 63 of the rear midsole component 14B particularly also has an area of overlap with the lateral side wall 66 of the front midsole component 14A.

Figure 6:
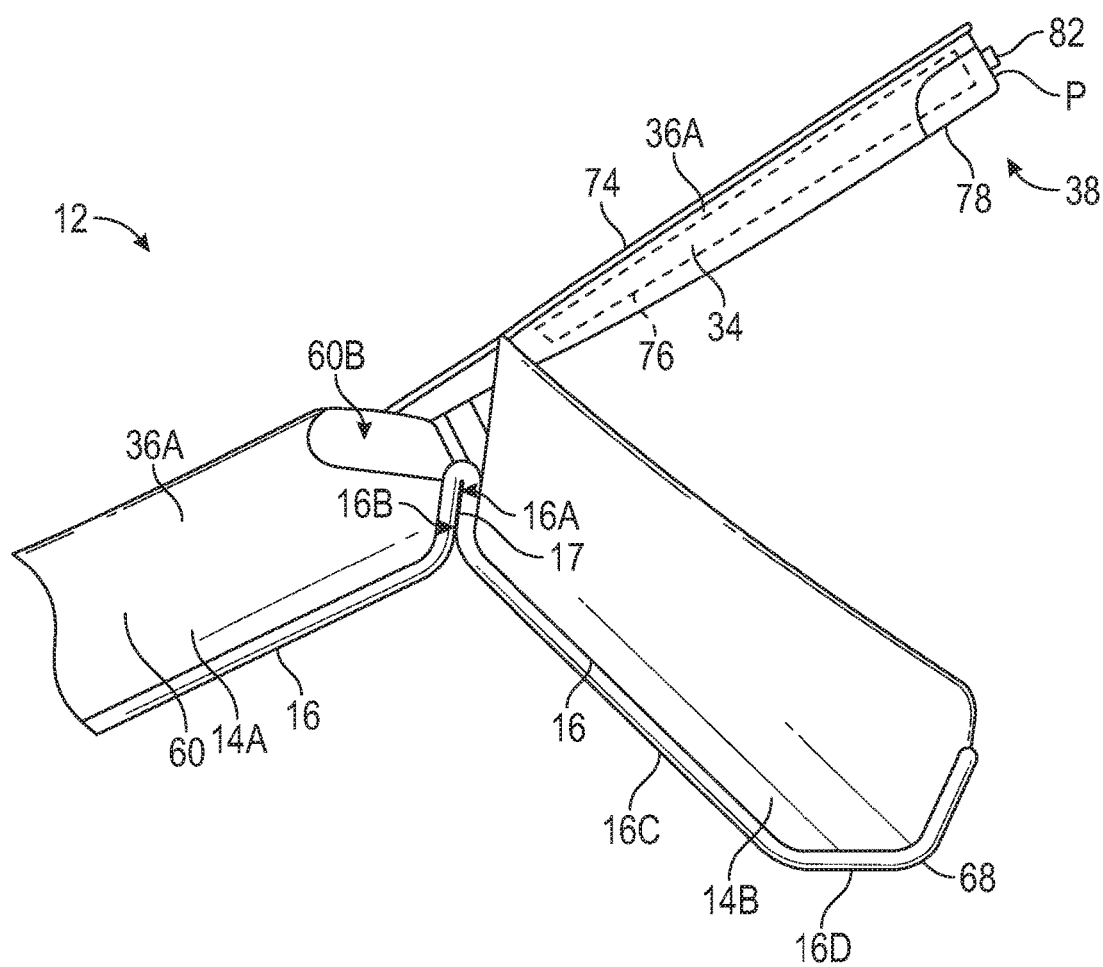
FIG. 6 is a fragmentary medial side view of the sole structure of FIG. 1 in the access position.

FIG. 6 shows the sole structure 12 in fragmentary view in the access position. The sole structure 12 rests on the rear portion 16D of the outsole 16 (at the medial region 75A and the lateral region 75B, best shown in FIG. 4). The groove 17 is shown fully closed, with the surfaces 16A, 16B substantially in contact with one another. In some configurations, the groove 17 may be partially closed, but not fully closed in the access position. Specifically, a rear surface 60B of the side wall 60 of the front midsole component 14A is exposed in the access position, as discussed further with respect to FIG. 8.

The heel footbed 38 is shown extending above the rear midsole component 14B. In FIG. 6, the heel footbed 38 particularly includes the portion of the body 36A of the front midsole component 14A that extends rearward to form the heel footbed 38. As shown by the flare of the heel footbed 38, the heel footbed 38 particularly increases in thickness in the rearward direction, providing additional cushioning in the heel region 30 of FIG. 1. A liner 74 of cloth or other material may be secured to the top surface of the body 36A. The liner 74 serves as the contact surface for the foot.

Specifically, a plate 76 is embedded in the body 36A. The plate 76 may be a material such as a plastic, nylon, carbon fiber, or a composite, that is relatively more rigid than the body 36A. Stated differently, the plate 76 particularly may have a first rigidity whereas the body 36A may have a second rigidity less than the first rigidity. For example, the first rigidity may be a bending stiffness of the body 36A, and the second rigidity may be a bending stiffness of the plate 76. The more rigid plate 76 stiffens the heel footbed 38, allowing it to more easily move past the inner surfaces of the rear upper portion 18B when transitioning between access and use positions than would a heel footbed without the plate 76. Fatigue life and environmental testing may be used to select appropriate materials for the plate 76. The ability of the plate 76 to bond to the body 36A may also be considered in selecting materials for the plate 76.

As shown in FIG. 10, the plate 76 is in the heel region 30 and is entirely rearward of the groove 17 when the footwear 10 is in the use position. Alternatively, the plate 76 may extend at least to the groove 17 (e.g., to the groove 17, or more forward then the groove 17), such as to the midfoot region 28 or the forefoot region 26.

The heel footbed 38 particularly includes a stiffening layer 78, particularly an external stiffening layer 78, on a rear of the body 36A. The external stiffening layer 78 may be secured to the body 36A, such as with adhesive, or may be coated on the body 36A, or otherwise applied to define a rear periphery P of the heel footbed 38. In one example, the external stiffening layer 78 is molded separately from the body 36A and is then adhered to the body 36A. In another example, foam used to form the body 36A may be processed such as by temperature-controlled curing so that the external stiffening layer is an integral external skin of the body 36A that is more dense than a remaining internal portion of the body 36A that it covers.

Figure 7:
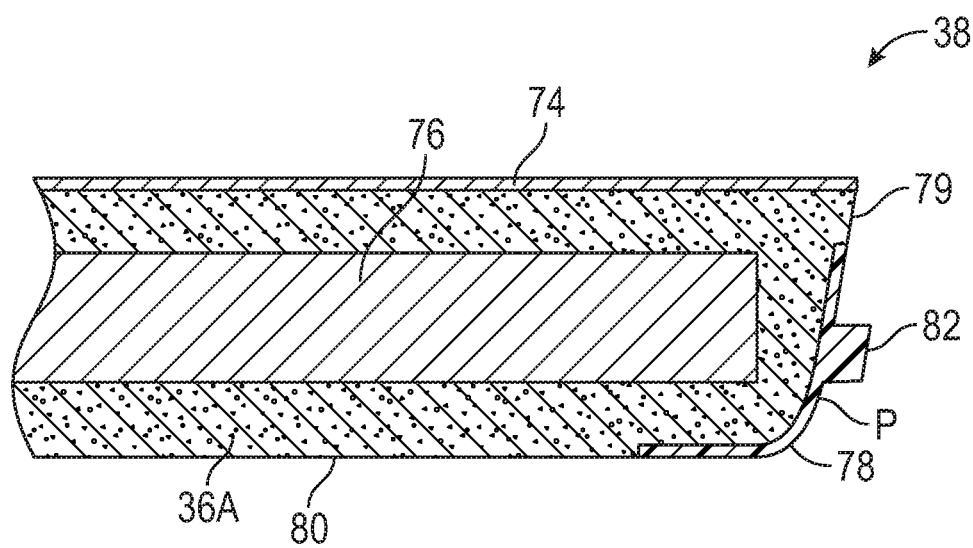
FIG. 7 is a cross-sectional view of a heel footbed of the sole structure, taken at lines 7-7 in FIG. 9.

With reference to FIG. 7, the external stiffening layer 78 extends around a rear 79 of the body 36A from the medial side (FIG. 6) to the lateral side (FIG. 9) and/or extends forward under a bottom 80 of the body 36A (FIG. 7). FIG. 7 shows a cross-sectional view of the heel footbed 38, taken at lines 7-7 in FIG. 9. The body 36A may be relatively less hard than the external stiffening layer 78. For example, the body 36A may have a first hardness and the external stiffening layer 78 may have a second hardness greater than the first hardness.

The harder external stiffening layer 78 particularly may also have a lower coefficient of friction than the body 36A, which may enable the heel footbed 38 to move more easily past the rear upper portion 18B between the access position and the use position than would a heel footbed 38 without the external stiffening layer 78.

The external stiffening layer 78 particularly protects the heel footbed 38 from wear as it interfaces with the rear upper portion 18B when moving between the access and use positions. For example, the body 36A may be elastomeric foam, as discussed, and the external stiffening layer 78 may be a semi-rigid or rigid plastic (such as a thermoplastic), a composite, nylon, a polyether block amide such as PEBAX® available from Arkema, Inc. in King of Prussia, Pa. USA, a fiberglass reinforced polyamide, a rigid thermoplastic polyurethane (with or without glass fiber).

The external stiffening layer 78 particularly includes at least one tab 82 substantially protruding rearward at the rear periphery P. Because the protruding tab 82 is of the harder material of the external stiffening layer 78, the tab 82 can compress and move past softer, compressible portions of the rear upper portion 18B and/or interlock with the rear midsole component 14B, as further discussed herein. The tab 82 is shown as the rearmost extent of the heel footbed 38, and the external stiffening layer 78 is shown extending under the body 36A and establishing a rear periphery P of the heel footbed 38.

Figure 8:
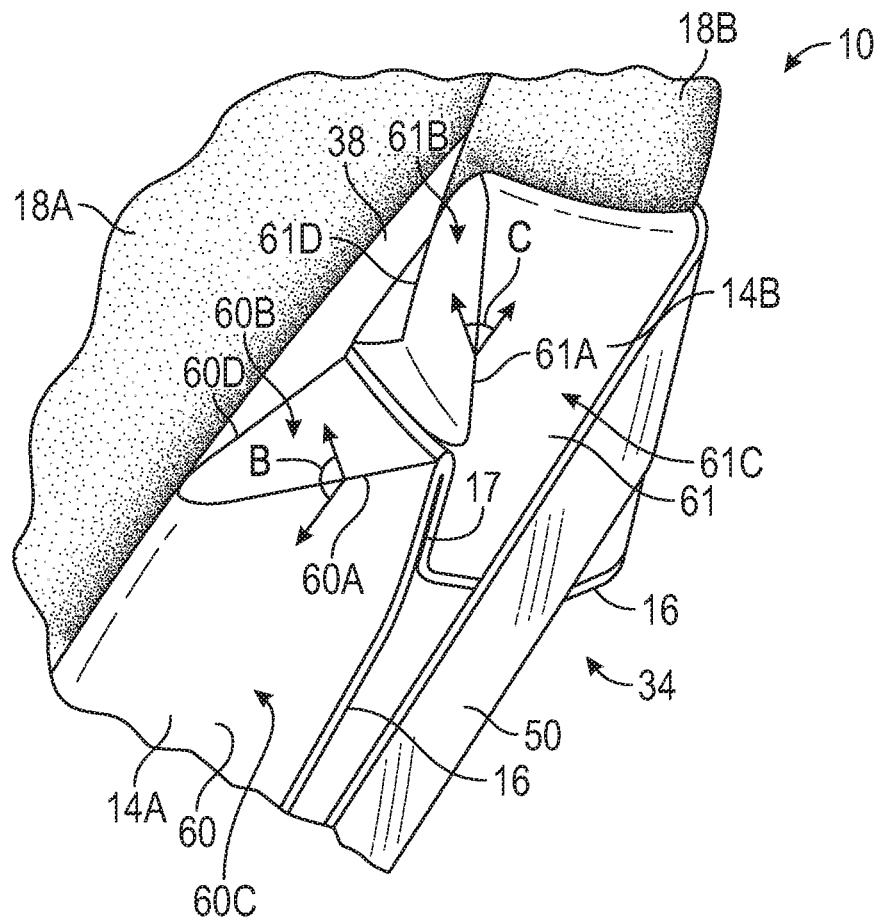
FIG. 8 is a fragmentary perspective view of the article of footwear of FIG. 1 in the access position.

FIG. 8 is a perspective and fragmentary view of the article of footwear 10 in the access position, with a vantage point from above, looking downward and rearward at the medial side 34 of the footwear 10. A front surface 61B of the side wall 61 of the rear midsole component 14B particularly faces a rear surface 60B of the side wall 60 of the front midsole component 14A in the use position. The front surface 61B particularly angles rearward from the outer edge 61A (also referred to as the front edge 61A) of the front surface 61B to an inner edge 61D of the front surface 61B.

The rear surface 60B of the side wall 60 of the front midsole component 14A particularly angles rearward from the outer edge 60A (also referred to as the rear edge 60A) of the rear surface 60B to an inner edge 60D of the rear surface 60B. An angle C between the exterior side surface 61C of the side wall 61 of the rear midsole component 14B and the front surface 61B of the side wall 61 particularly is an acute angle. An angle B between the exterior side surface 60C of the side wall 60 of the front midsole component 14A and the rear surface 60B of the side wall 60 particularly is an obtuse angle. The angles B and C particularly may be complementary angles. In other words, the sum of the angles B and C may be 180 degrees. This allows the front surface 61B and the rear surface 60B to be coextensive, and allows the side surfaces 60C, 61C to be flush with one another at the closed groove 17 in the use position. In such configurations, any minor separation between the rear edge 60A and the front edge 61A in the use position will be less noticeable, as the obtusely-angled, rear surface 60B will be directly inward of any gap between the exterior side surfaces 60C, 61C, rather than the gap extending normal to the exterior side surfaces 60C, 61C as it would if the front and rear surfaces 61B, 60B were orthogonal to the exterior side surfaces 60C, 61C. Additionally, with the edges 60A and 61A and the edges 63A, 66A extending forward of the groove 17 in the use position, any water or other liquid that may inadvertently move inward of the edges will tend to drain outward and downward along the rear surface 60B forward of the groove 17, and along a like surface on the lateral side 32.

Figure 9:
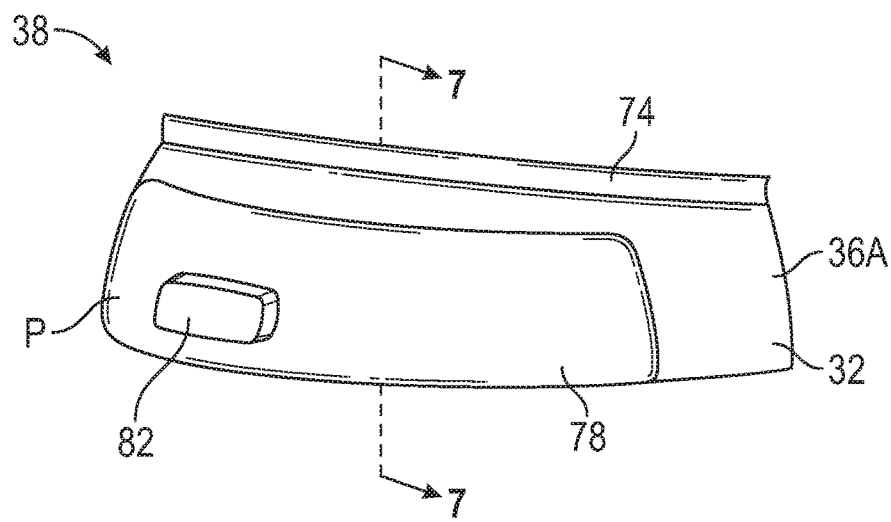
FIG. 9 is a rear perspective and fragmentary view of the heel footbed of the sole structure of FIG. 1.

FIG. 9 is a perspective fragmentary view of the heel footbed 38, from a vantage point rearward of and at the lateral side of the heel footbed 38 and looking forward. FIG. 9 illustrates the external stiffening layer 78 defining the rear periphery P of the heel footbed 38, with the tab 82 defining the rearmost extent.

FIG. 10 is a perspective fragmentary view of the article of footwear 10 in the use position, from a vantage point above and looking downward and rearward at the medial side 34 of the footwear 10. Sides 18A1, 18A2 of the front upper portion 18A and sides 18B1, 18B2 of the rear upper portion 18B particularly overlap in the use position. For example, the sides overlap in the transverse direction in the use position as forward ends of the medial and lateral sides 18B1, 18B2 of the rear upper portion 18B are disposed laterally-outward of rear ends of medial and lateral sides 18A1, 18A2 of the front upper portion 18A. Alternatively, the footwear 10 could be configured so that forward ends of the medial and lateral sides of the rear upper portion 18B are laterally-inward of rear ends of medial and lateral sides of the front upper portion 18A. The footwear upper 18 thus has increased thickness where the sides of the front and rear upper portions 18A, 18B overlap in the heel region 30. The increased thickness may lend lateral stability to the heel region 30 of the upper 18 in the use position.

The rear periphery P of the heel footbed 38 is surrounded by the rear upper portion 18B and overlays the rear midsole component 14B in the use position shown in FIG. 10. The heel footbed 38 has a transverse width less than the width of the space between the sides 18A1, 18A2 of the rear upper portion 18B. The heel footbed 38 is within the foot-receiving cavity 40 formed by the upper portions 18A, 18B in the use position.

The rear upper portion 18B includes at least one compliant protrusion 88 that protrudes forward into the foot-receiving cavity 40 above the heel footbed 38 when the article of footwear 10 is in the use position. The protrusion 88 may be, for example, a bulge of foam padding at the inner periphery of the rear upper portion 18B below the rear edge 48B. The protrusion 88 particularly provides enough compliance to permit the heel footbed 38 to move past the protrusion 88 when moving to the access position, and so that the rear upper portion 18B comfortably secures to ankles of different girths. For example, the protrusion 88 may be shaped to conform to and protect the Achilles. Additionally, the elastic heel band 19 stretches to conform to the rear of a wearer's foot and biases the protrusion 88 forward toward the foot to ensure a comfortable yet secure fit.

Because the protruding tab 82 is of the relatively hard material of the external stiffening layer 78, the tab 82 may compress the protrusion 88 to move past the protrusion 88 when the rear of the heel footbed 38 moves from the access position to the use position or from the use position to the access position along the double-sided arrow 90 representing the direction of motion. The rigidity of the embedded plate 76 particularly may also prevent twisting of the heel footbed 38, further enabling the heel footbed 38 to compress the compliant protrusion 88 when the sole structure 12 moves from the access position to the use position, allowing the heel footbed 38 to move past the protrusion 88.

Figure 11:
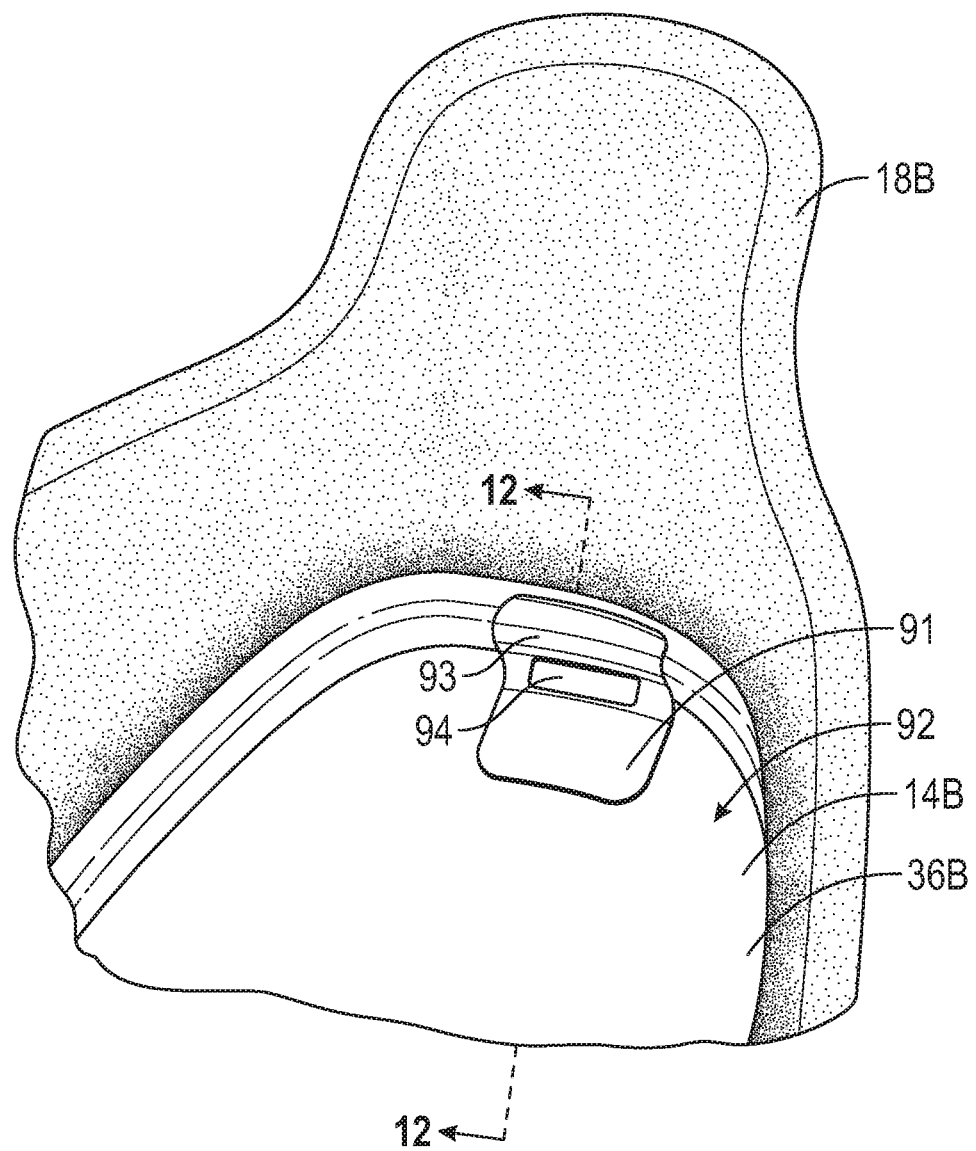
FIG. 11 is a perspective and fragmentary view of the rear midsole component and rear upper portion of FIG. 10, with the heel footbed removed.

With reference to FIG. 11, the rear midsole component 14B includes at least one stiffening component 91 particularly disposed on the body 36B. More specifically, the stiffening component 91 is adhered or otherwise secured to the body 36B so that the stiffening component 91 at least partly is exposed at a foot-facing surface 92 of the body 36B. The stiffening component 91 particularly is relatively harder than the body 36B. For example, the body 36B may be elastomeric foam, as discussed, and the stiffening component 91 may be a plastic (such as a thermoplastic), a composite, nylon, a polyether block amide such as PEBAX® available from Arkema, Inc. in King of Prussia, Pa. USA, a fiberglass reinforced polyamide, a rigid thermoplastic polyurethane (with or without glass fiber).

Figure 12:
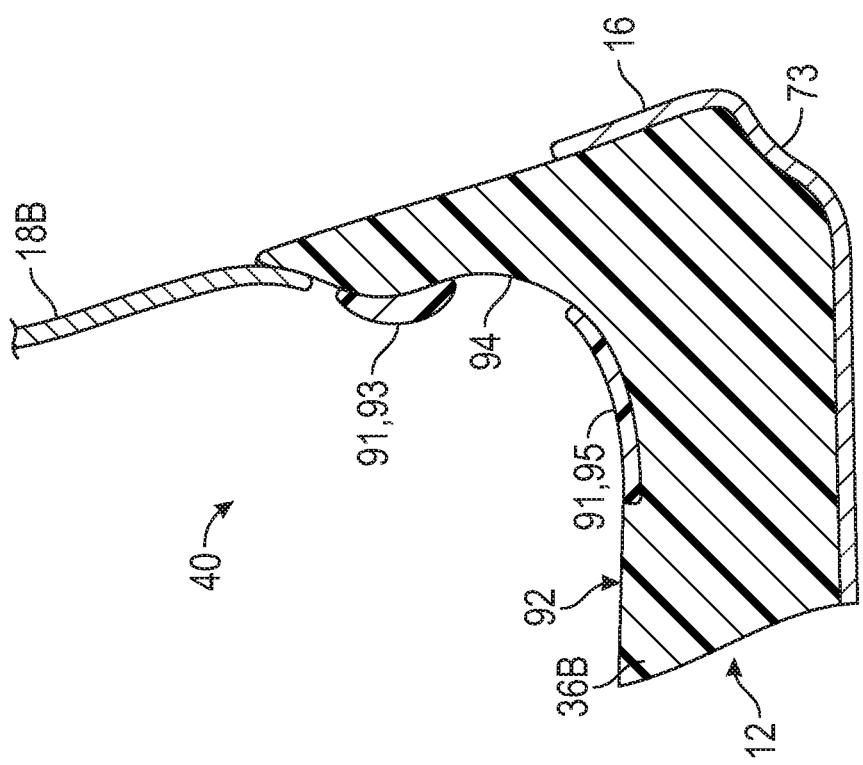
FIG. 12 is a fragmentary cross-sectional view of the rear midsole component and rear upper portion of FIG. 11 taken at lines 12-12 in FIG. 11.

The stiffening component 91 includes at least one rib 93 that projects forward at a rear of the foot-facing surface 92. The projection of the rib 93 is best shown in FIG. 12. As such, the rib 93 protrudes into the foot-receiving cavity 40 over the bottom portion of the foot-facing surface 92. In another embodiment, the body 36B may define at least one rib.

As best shown in FIG. 12, the stiffening component 91 also defines a recess 94 below the rib 93 and/or includes a lower portion 95 extending forward along the foot-facing surface 92. In other embodiments, the stiffening component 91 may include only the rib 93. The recess 94 particularly may be at an aperture defined by the stiffening component 91. Due to its protruding construction at the rib 93, the tab 82 of the external stiffening layer 78 interfaces with the rib 93 when the sole structure 12 moves from the access position to the use position, and when the sole structure 12 moves from the use position to the access position.

The extension of the tab 82 rearward, and the protrusion of the rib 93 forward causes the relatively soft body 36A at the heel footbed 38 and/or the relatively soft body 36B of the rear midsole component 14B to elastically deform in the longitudinal direction of the footwear 10 in order to allow the tab 82 to ride along the exterior surface of the rib 93 and move over the rib 93. The embedded plate 76 particularly helps to prevent twisting or buckling of the heel footbed 38 during the deformation. Once the tab 82 moves past the rib 93, the body 36A and/or 36B resiliently recovers from the elastic deformation by springing back to a pre-deformed state (e.g., the respective shape prior to the deformation caused by the tab 82 interfacing with the rib 93, but as may be different than when the sole structure 12 is in the access position due to any deformation caused by the weight of the foot of the wearer). The interfacing of the tab 82 and the rib 93 particularly is thus a snap-fit or interlocking feature.

The deformation and recovery particularly may provide an auditory and/or sensory signal to the wearer that the sole structure 12 has completed movement to the use position. The relatively hard materials of the rib 93 and tab 82 may provide an audible click when the tab 82 interferes with and moves past the rib 93, serving as a signal that the sole structure 12 has completed movement to the use position. Additionally or alternatively, movement of the body 36A or 36B during deformation and resilient spring-back may be felt by wearer through the overlying foot contacting the bodies 36A, 36B, serving as a sensory signal indicating that the sole structure has completed movement to the use position.

Figure 13:
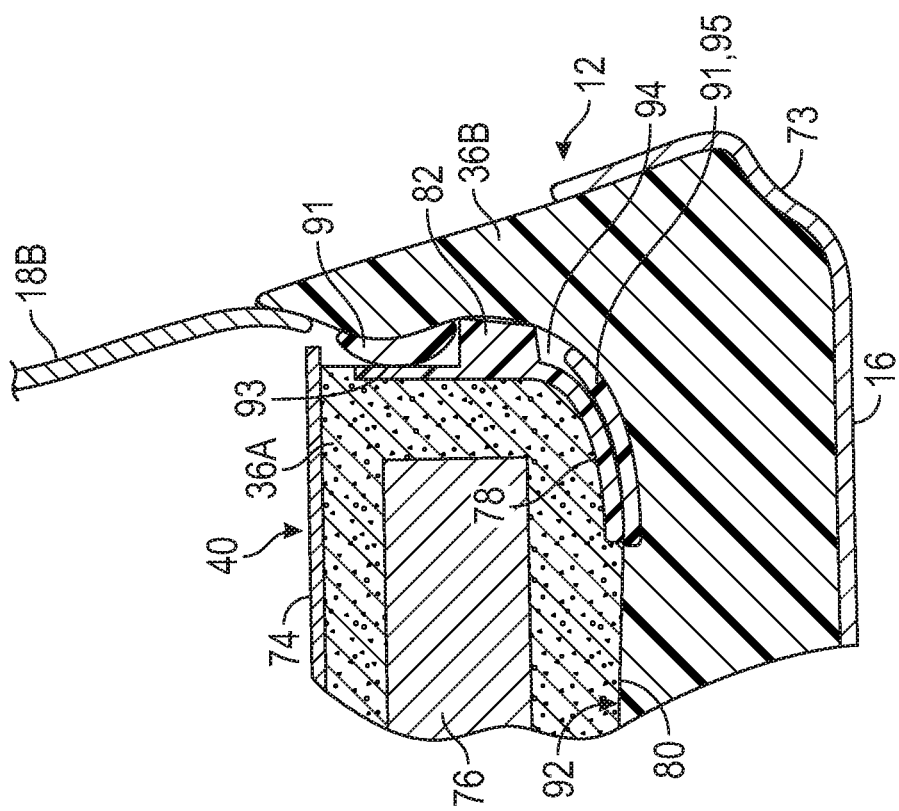
FIG. 13 is a fragmentary cross-sectional view of the rear midsole component and rear upper portion of FIG. 12 with the heel footbed disposed in the use position.

With the weight of a foot applied, the bottom 80 of the body 36A rests on the foot-facing surface 92. Without the application of force, the tab 82 will not move past the rib 93, either from above (e.g., from the access position to the use position) or from below (e.g., from the use position to the access position). Together the tab 82 and rib 93 function as a lock to retain the heel footbed 38 in the use position. The tab 82 may be disposed in the recess 94 when the sole structure 12 is in the use position, as best shown in FIG. 13.

Accordingly, the rear periphery P of the heel footbed 38 particularly is surrounded by the rear upper portion 18B and the heel footbed 38 overlays the rear midsole component 14B in the use position. The interfitting of the heel footbed 38 of the front midsole component 14A with the rear midsole component 14B in the use position particularly helps stabilize the sole structure 12 in the use position. The compliant protrusion 88 particularly helps to further stabilizes the divided upper 18 in the use position as it provides at least some resistance to the heel footbed 38 moving past the compliant protrusion 88 out of the foot-receiving cavity 40.

FIG. 14 shows the outsole 16 wrapping upward along the rear midsole component 14B and over the ridge 68. The concavity 73 is apparent in FIGS. 12-15. The elastic heel band 19 is shown extending across the rear of the rear upper portion 18B from the lateral side 32 to the medial side 34. The elastic biasing member 50 is shown secured at the second location 53 to the rear midsole component 14B.

Figure 15:
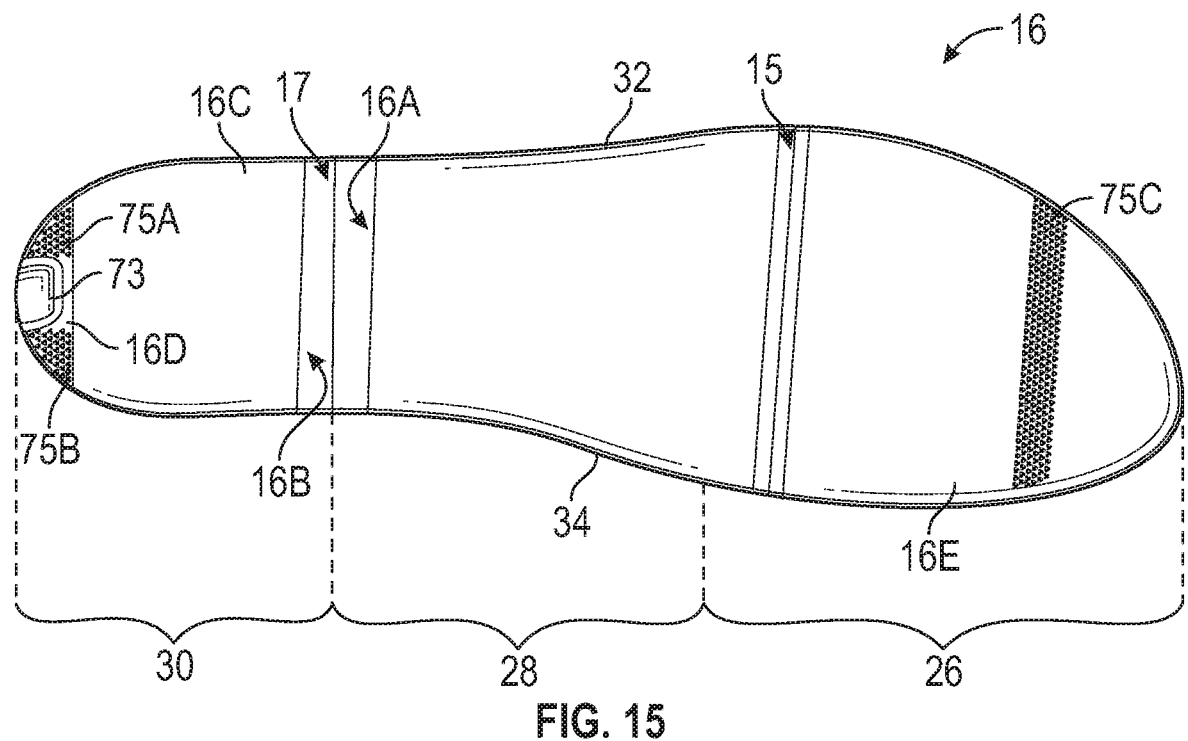
FIG. 15 is a bottom view of an outsole of the sole structure of FIG. 1 in the use position.

FIG. 15 shows the connecting member 16 (outsole 16), including the bottom portion 16C, which particularly serves as the ground contact surface in the use position, and/or the rear portion 16D and front portion 16E which particularly serve as the ground contact surface in the access position. The outsole 16 particularly is shown as one-piece from the forefoot region 26 to the heel region 30 and extending from the lateral side 32 to the medial side 34. In other embodiments, the outsole could be multiple discreet pieces, including a piece that extends longitudinally and laterally across and lines the groove 17. In other embodiments, the connecting member 16 may only extend partway across the width of the groove (e.g., only partway from the medial side to the lateral side of the midsole components 14A, 14B) and need not extend longitudinally beyond the groove 17. However, when the connecting member extends longitudinally beyond the groove 17 and extends transversely substantially across the width of the sole structure at the groove 17, such as the outsole 16 shown, twisting of the front midsole component 14A relative to the rear midsole component 14B during movement of the sole structure 12 between the access and use positions may be minimized.

The groove 17 particularly is shown as asymmetric, in that the exterior surface 16A of the outsole 16 lining the front wall of the groove 17 may be slightly wider in the longitudinal direction than the rear exterior surface 16B of the outsole 16 lining the rear wall of the groove 17.

Figure 16:
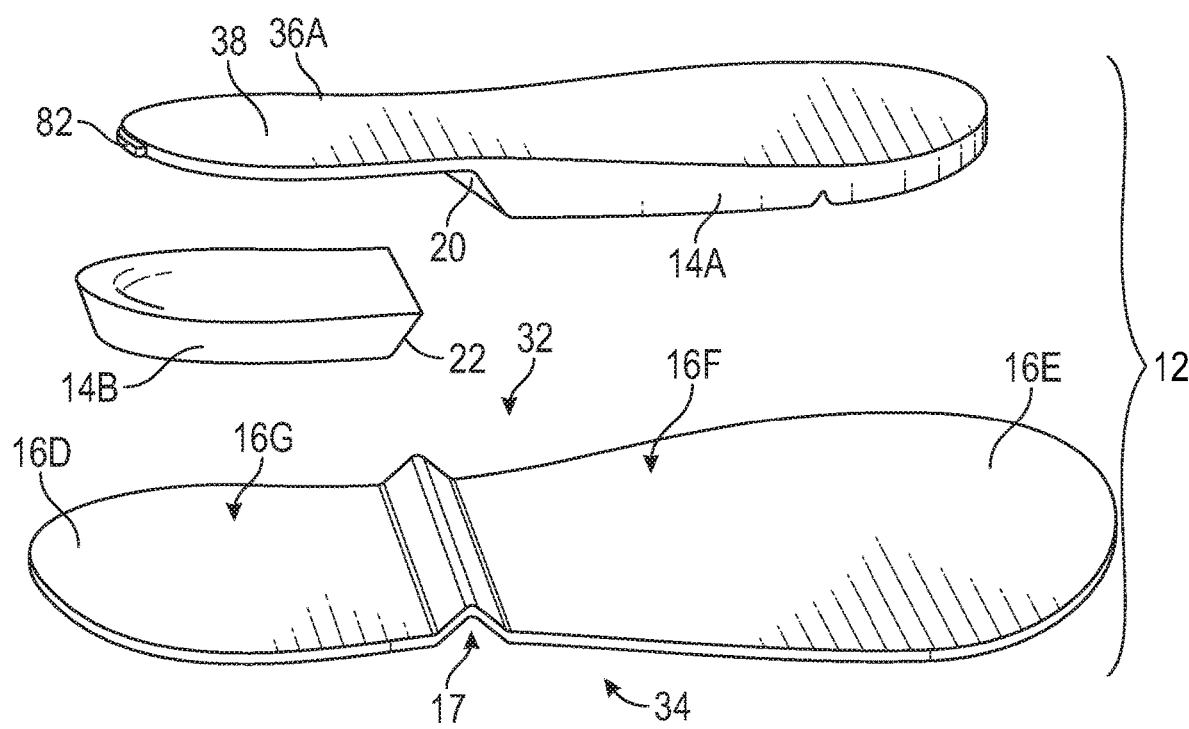
FIG. 16 is an exploded perspective view of the sole structure of FIG. 1.

FIG. 16 shows the sole structure 12 of FIG. 1 in an exploded view. The outsole 16 may be pre-formed by injection molding, compression molding or otherwise to include the groove 17. In one example, after the outsole 16 is formed, the bottom of the front midsole component 14A is connected to the upper surface 16F of the outsole 16 forward of the groove 17 (e.g., including the front portion 16E) and at the front half of the groove 17 so that the outsole 16 lines the rear wall 20 of the front midsole component 14A at the groove 17. The bottom of the rear midsole component 14B is connected to the upper surface 16G of the outsole 16 rearward of the groove 17 (e.g., including the rear portion 16D of the outsole 16) so that the outsole 16 lines the front wall 22 of the rear midsole component 14B at the groove 17. The front midsole component 14A and the rear midsole component 14B may be connected to the outsole 16 in this manner by adhesive.

Alternatively, the components of the sole structure 12 may be insert molded particularly by inserting the outsole 16 with the pre-formed groove 17 into a mold and injecting foam or other material into the mold to simultaneously form and connect the front midsole component 14A and the rear midsole component 14B to the outsole 16. In another example, the front midsole component 14A and the rear midsole component 14B may be connected in an additive manner to the outsole 16 with the pre-formed groove 17, such as by 3-D printing the front midsole component 14A and the rear midsole component 14B onto the upper surfaces 16F, 16G of the outsole 16.

Figure 17:
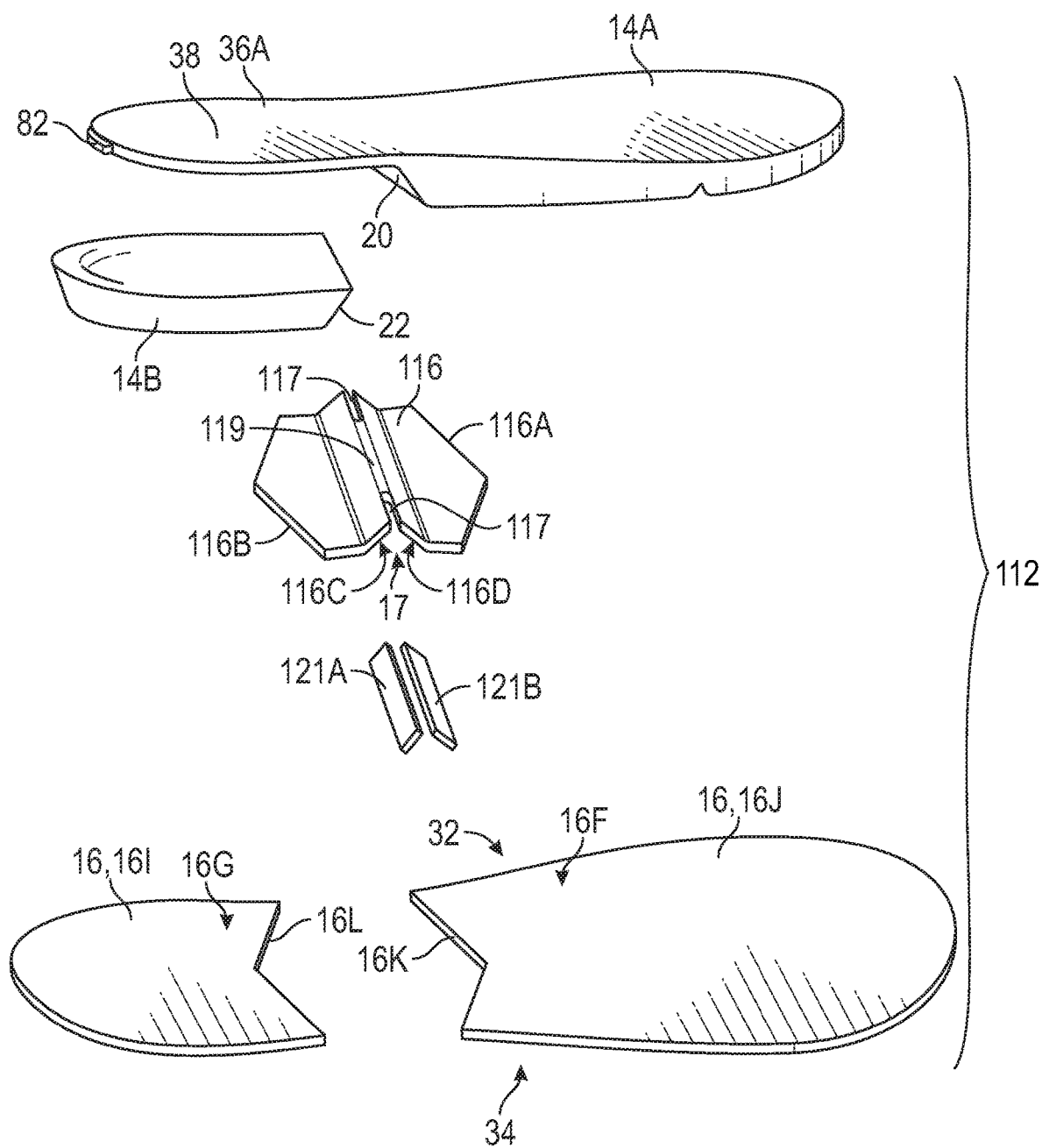
FIG. 17 is an exploded perspective view of an alternative embodiment of a sole structure for the article of footwear of FIG. 1 with a connecting member that is a plate.

FIG. 17 shows an alternative embodiment of a sole structure 112 within the scope of the present teachings. The sole structure 112 includes a connecting member 116 that may be referred to as a plate 116 and/or may pre-molded with the groove 17. In some embodiments, the plate 116 may be the same material as the front and rear portions 16I, 16J of the outsole 16 and may be considered as part of the outsole 16. In other embodiments, the plate 116 may be a rigid or semi-rigid plastic such as a thermoplastic polyurethane.

Specifically, the plate 116 is connected to the rear wall 20 of the front midsole component 14A, to the bottom of the front midsole component 14A forward of the rear wall 20, to the front wall 22 of the rear midsole component 14B, and/or to the bottom of the rear midsole component 14B just rearward of the front wall 22. The plate 116 thus particularly lines the rear wall 20 and the front wall 22 at the groove 17. The plate 116 has one or more notches 117 at the medial and/or lateral sides near a peak 119 of the plate 116 over the groove 17 to particularly reduce stress concentrations at the medial and lateral sides of the peak 119. The notches 117 may be smaller than shown, or the plate 116 may have no notches 117.

Specifically, one or more ribs 121A, 121B may be secured at the wall(s) 116C, 116D of the plate 116 in the groove 17. The ribs 121A, 121B particularly may serve as reinforcing members and/or bumpers or spacers in the groove 17. For example, the ribs 121A, 121B may extend slightly outward from the walls 116C, 116D into the groove 17 so that the ribs 121A, 121B rather than the walls 116C, 116D contact one another in the access position (e.g., when the groove 17 is closed). The ribs 121A, 121B do not extend across the top of the groove 17 between the walls 116C, 116D so as not to increase resistance to pivoting of the sole structure 12 at the groove 17.

The front midsole component 14A particularly is connected to a front portion 16J of the outsole 16 at the upper surface 16F of the outsole 16 forward of the connecting member 116.

The rear midsole component 14B particularly is connected to a rear portion 16I of the outsole 16 at the upper surface 16G of the outsole 16 rearward of the plate 116.

The front midsole component 14A and/or the rear midsole component 14B may be connected to the outsole 16 in this manner by bonding such as with adhesive, or by insert molding, co-molding, and/or additive 3-D printing similarly as described with respect to the sole structure 12.

The plate 116 and the outsole portions 16J and 16I particularly may be configured to interfit. For example, a rear edge 16K of the outsole portion 16J may be shaped to follow and/or abut a front edge 116A of the plate 116 from the medial side 34 to the lateral side 32 of the sole structure 112. Similarly, a forward edge 16L of the outsole portion 16I may be shaped to follow and/or abut a rear edge 116B of the plate 116 from the medial side 34 to the lateral side 32.

In the embodiment shown, the rear edge 16K of the front portion 16J of the outsole 16 slightly overlaps the front edge 116A of the plate 116, and the forward edge 16L of the rear portion 16I of the outsole 16 slightly overlaps the rear edge 116B of the plate 116 so that the edges 116A, 116B of the plate 116 are disposed between the outsole 16 and the midsole components 14A, 14B, respectively.

Figure 18:
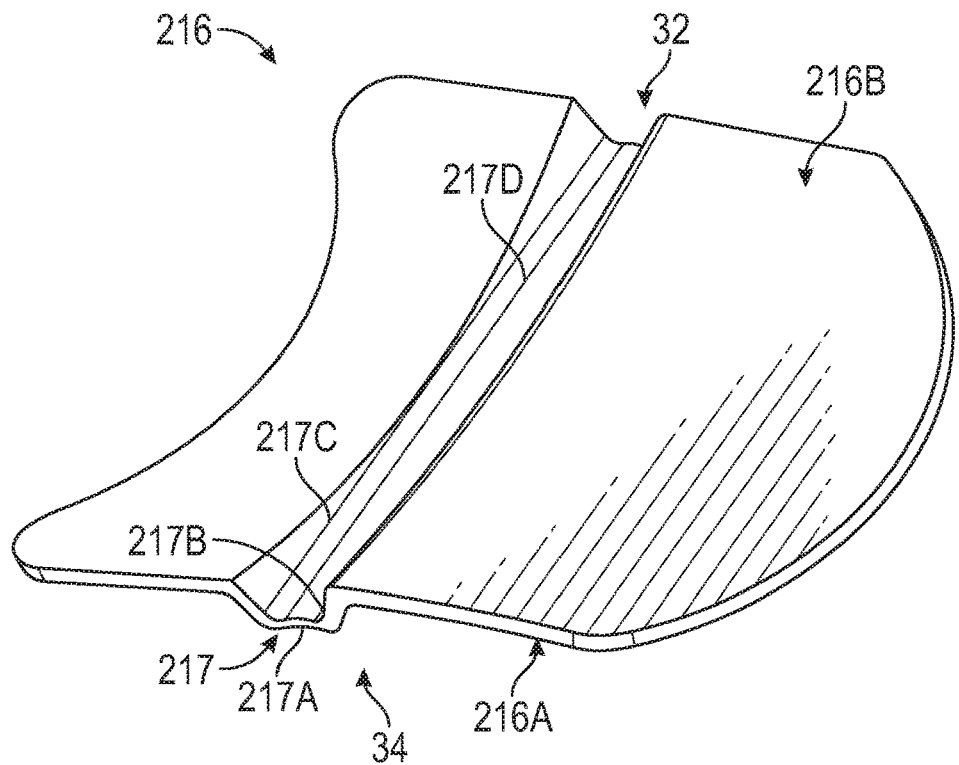
FIG. 18 is a perspective view of an alternative embodiment of a connecting member for a sole structure of the article of footwear of FIG. 1, with the connecting member in the access position.

FIG. 18 shows an alternative embodiment of a connecting member 216 that may be connected with the front and rear midsole components 14A, 14B. The connecting member 216 particularly may be a plate 116 that interfits with outsole components, and/or may be more rigid than the outsole components, may be a different material than the outsole components, or may be the same material as the outsole components. Alternatively, the connecting member 216 may be dimensioned as a unitary outsole.

The connecting member 216 particularly includes at least one pre-formed transverse groove 217 that particularly extends from a medial side 34 to a lateral side 32 of the connecting member 216. The groove 217 particularly is a complex groove rather than a single, inverted V as in FIG. 1.

Specifically, the complex groove 217 is pre-formed with a central transverse groove 217A that forms an inverted V at a bottom side 216A of the plate 216. The complex groove 217 particularly is pre-formed with a forward transverse groove 217B of a top side 216B of the plate 216 particularly extending transversely from the medial side 34 to the lateral side 32 forward of and parallel with the central transverse groove 217A. The complex groove 217 particularly is pre-formed with a rearward transverse groove 217C particularly extending transversely from the medial side to the lateral side rearward of and parallel with the central transverse groove 217A.

A peak 217D particularly is formed to extend transversely over the central transverse groove 217A and/or between the front and rear transverse grooves 217B, 217C. In the use position shown in FIG. 18, the groove 217A is relatively open so that the peak 217D is relatively flattened.

Figure 19:
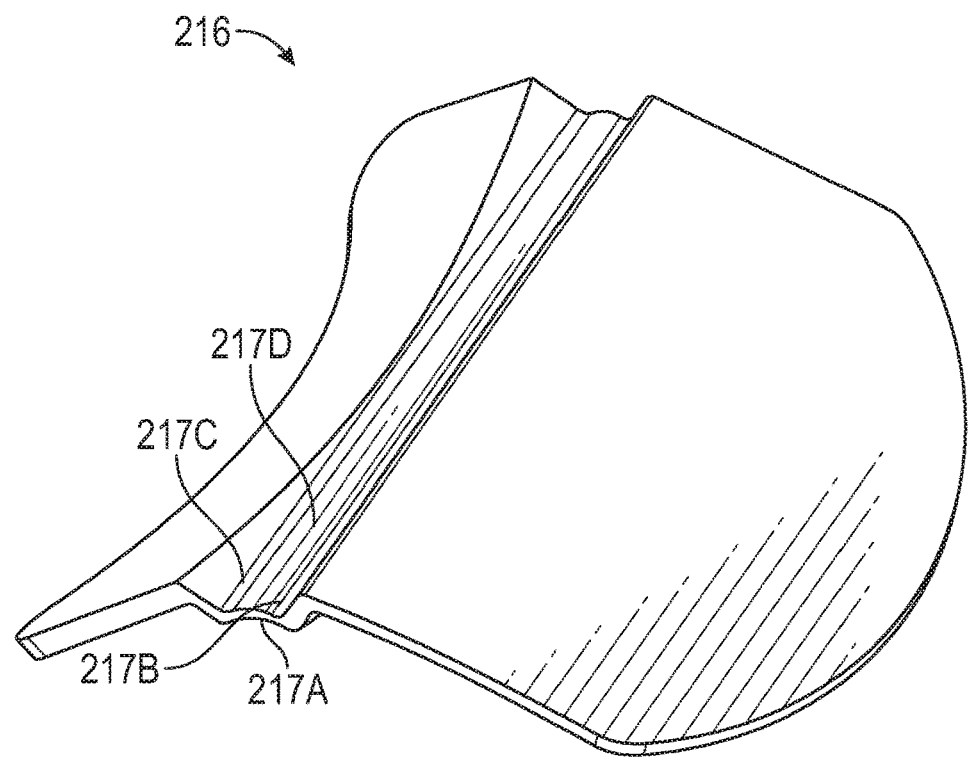
FIG. 19 is a perspective view of the connecting member of FIG. 18 in a use position.

Specifically, in the access position shown in FIG. 19, the groove 217A is relatively closed and the peak is relatively protruding between the grooves 217B, 217C. The grooves 217B, 217C together form a relatively U-shaped channel in the use position, and together form an undulating, W-shaped channel in the access position.

Figure 20:
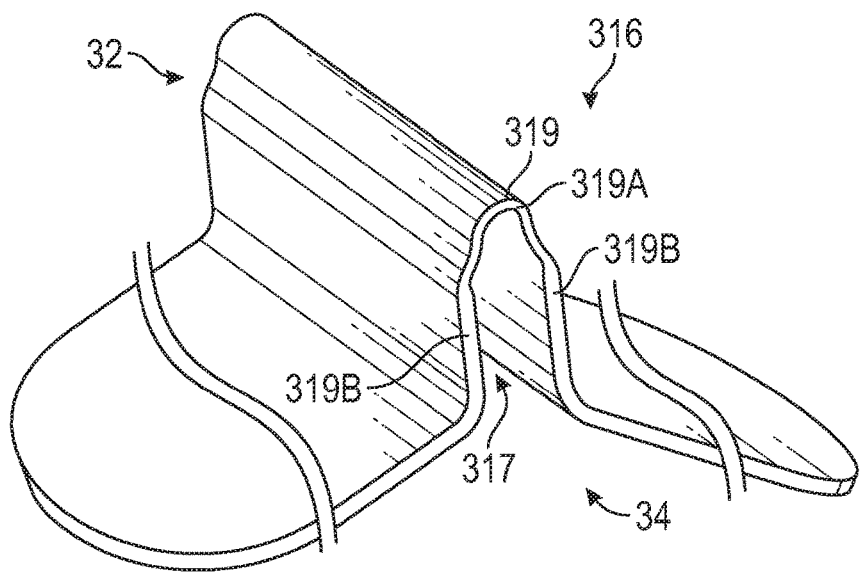
FIG. 20 is a perspective view of an alternative embodiment of a connecting member for a sole structure of the article of footwear of FIG. 1, with the connecting member in the access position.

FIG. 20 shows an embodiment of a connecting member 316 pre-formed with at least one groove 317. The connecting member 316 particularly is relatively thin at a rounded peak 319 of the groove 317 to decrease the bending stiffness of the connecting member 316 at groove 317. For example, the connecting member 316 has a relatively thin wall portion 319A at the rounded peak 319 that is integrally formed with and transitions to relatively thick wall portions 319B forward and rearward of the relatively thin wall portion 319A. Because the relatively thin wall portion 319A is rounded at the peak 319, internal forces are dispersed rather than concentrated during bending.

Figure 21:
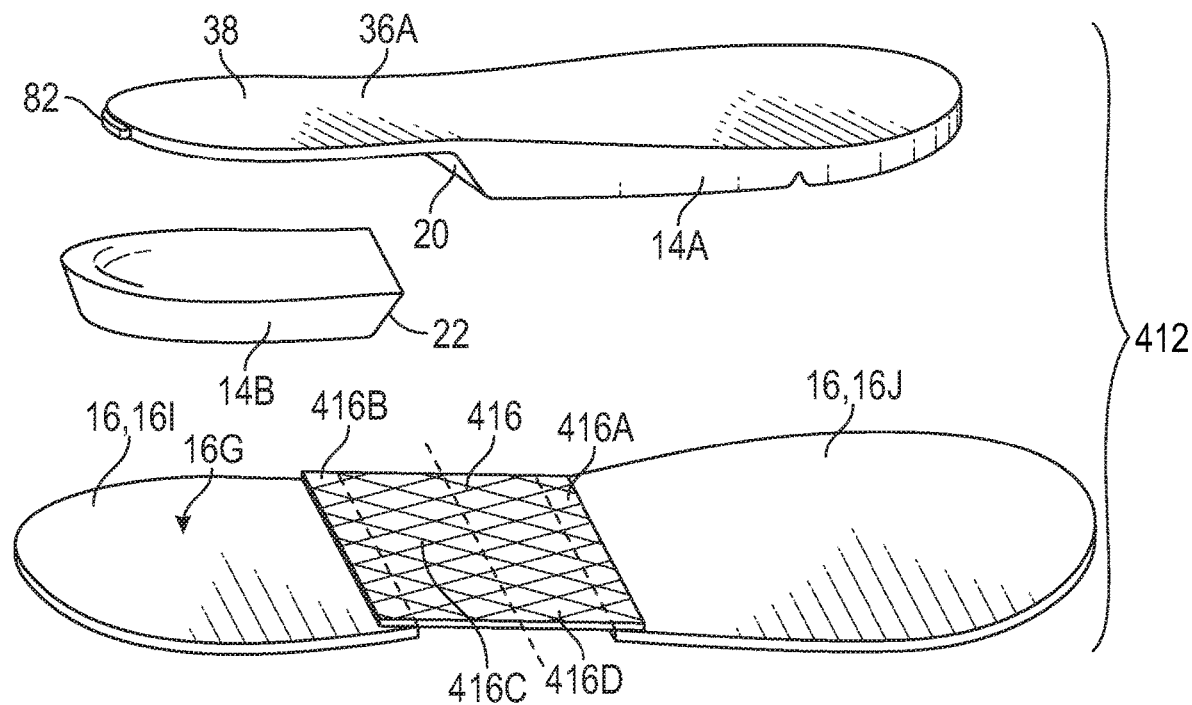
FIG. 21 is an exploded perspective view of an alternative embodiment of a sole structure for the article of footwear of FIG. 1 with a connecting member that is a plate.

FIG. 21 shows an alternative embodiment of a sole structure 412 with a connecting member 416 that particularly is a relatively thin, flexible textile component such as a textile sheet. The front portion 16J of the outsole 16 is connected to a front portion 416A of the textile component 416 such as by bonding with adhesive, by sewing, or by thermal-bonding.

The rear portion 16I of the outsole 16 particularly is connected to a rear portion 416B of the textile component 416 such as by bonding with adhesive, by sewing, or by thermal-bonding. A rear central portion 416C of the textile component 416 particularly is secured to the front wall 22 and the bottom of the rear midsole component 14A is secured to the upper surface 16G of the rear portion 16I.

The rear portion 416B of the textile component 416 may be sandwiched between the rear midsole component 14B and the rear outsole portion 16I. A front central portion 416D of the textile component 416 particularly is connected to the rear wall 20 of the front midsole component 14A. The front portion 416A of the textile component 416 may be sandwiched between the front midsole component 14A and the outsole portion 16J. The connecting member 416 thus lines the rear wall 20 and the front wall 22.

In the use position, the rear wall 20 and the front wall 22 particularly are juxtaposed and form an inverted V shape, as in FIG. 1, but with the textile component 416 rather than the outsole 16 lining the rear wall 20 and the front wall 22 and defining the groove 17. The front midsole component 14A and the rear midsole component 14B may be connected to the outsole 16 by bonding such as with adhesive, or by insert molding, co-molding, or additive 3-D printing similarly as described with respect to the sole structure 12.

Figure 22:
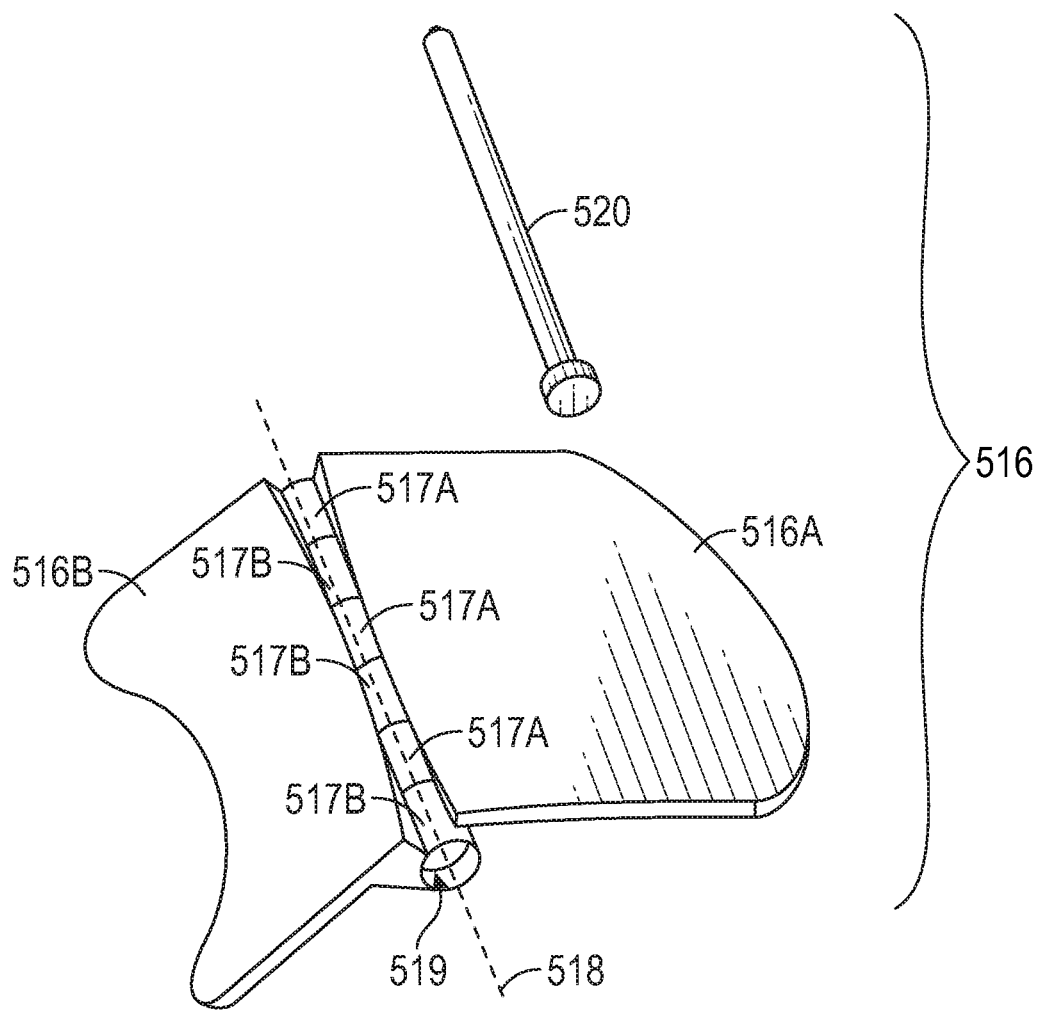
FIG. 22 is a perspective view of an alternative embodiment of a connecting member for a sole structure of the article of footwear of FIG. 1, with the connecting member in the access position.

FIG. 22 shows another embodiment of a connecting member. The connecting member 516 includes a front portion 516A and a rear portion 516B. The front and rear portions 516A, 516B particularly may be a relatively rigid or semi-rigid plastic, may serve as an outsole, or may interfit with outsole components and be a different material than the outsole.

The front portion 516A particularly has a first set of spaced knuckles 517A. The rear portion 516B particularly has a second set of spaced knuckles 517B that are configured to interfit with the spaced knuckles 517A to define a pivot axis 518 and a hollow cylinder 519 through which a pivot pin 520 extends to pivotably connect the front portion 516A to the rear portion 516B. The connecting member 516 may be secured by adhesive, co-molding, insert molding, or otherwise, to the midsole components 14A, 14B. For example, the front portion 516A may be molded with or inserted into the front midsole component 14A particularly so that the pivot axis 518 is at the top of the rear wall 20 and extends transversely along the rear wall 20. The rear portion 516B may be molded with or inserted onto the top surface of the rear midsole component 14B particularly so that the pivot axis 518 is at the top of the front wall 22 and extends transversely along the front wall 22.

FIG. 23 is a medial side view of an alternative embodiment of an article of footwear 610 with a sole structure 612 in a use position. The article of footwear 610 has many of the same components with the same features and functions as described with respect to the article of footwear 10. Like reference numbers are used to refer to the same components and their description is not repeated. In the article of footwear 610, the elastic biasing member 650 is removably secured to the sole structure 612 particularly via hook-and-loop fasteners 657.

Figure 30:
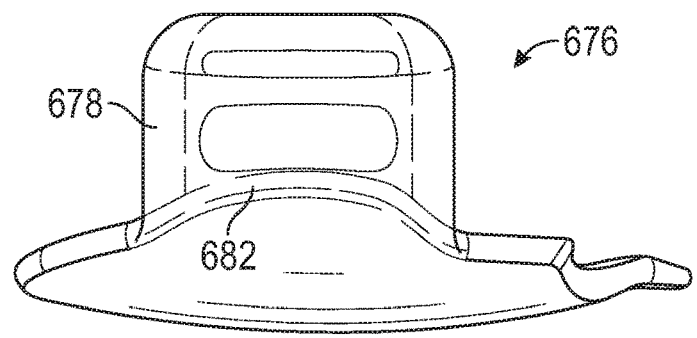
FIG. 30 is a rear view of the plate of FIG. 27.
Figure 31:
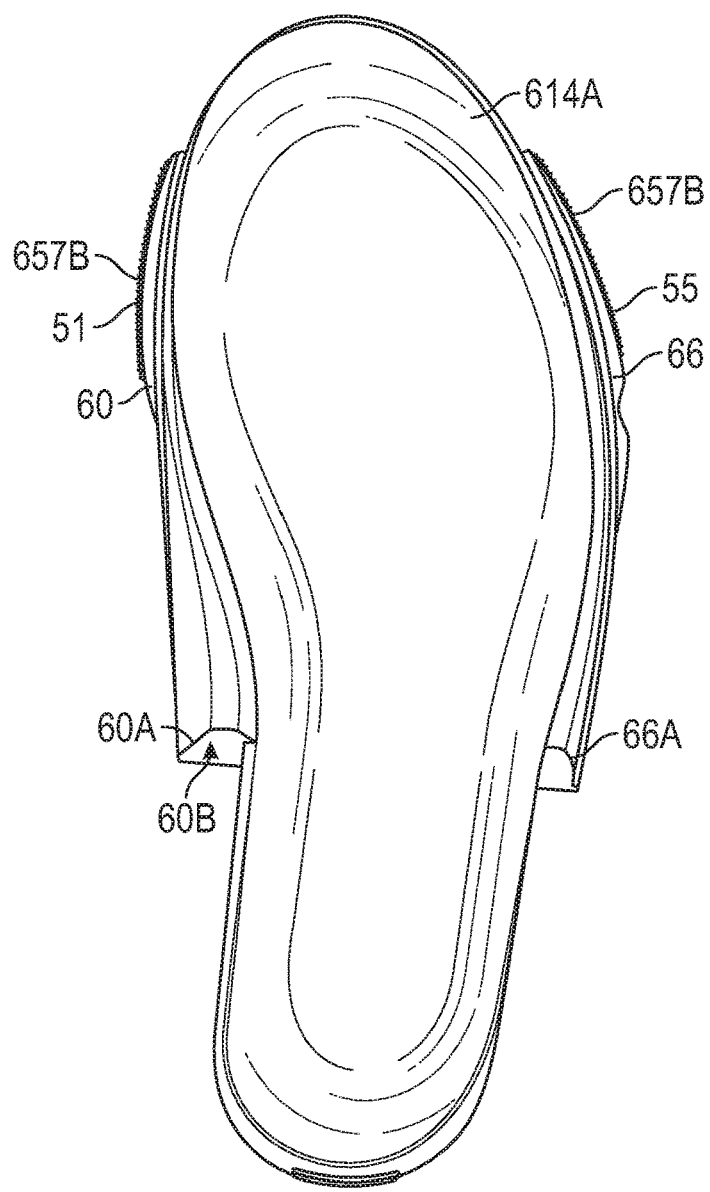
FIG. 31 is a plan view of the front midsole component of FIG. 27 with hook and loop fastener portions secured to medial and lateral sidewalls.

Specifically, each fastener 657 includes a first fastener component 657A and a second fastener component 657B as described herein with respect to FIGS. 23, 24, and 31. As described with respect to FIGS. 26-30, a plate 676 particularly is externally secured to the heel footbed 638 of the front midsole component 614A rather than embedded therein.

Accordingly, the article of footwear 610 includes a sole structure 612 with a front midsole component 614A and a rear midsole component 614B. The front and rear midsole components 614A, 614B are configured as described with respect to front and rear midsole components 14A, 14B, respectively. A connecting member (e.g., the outsole 616) particularly connects the front midsole component 614A to the rear midsole component 614B and defines at least one groove 17 particularly at a lower side of the sole structure 612 between the front midsole component 614A and the rear midsole component 614B. The front midsole component 614A and the rear midsole component 614B are pivotable relative to one another at the groove 17 between a use position (FIG. 23) and an access position (which is the same as that in FIG. 3) so that confronting surfaces 16A, 16B of the connecting member 616 at the groove 17 are closer to one another in the access position than in the use position with the groove 17 relatively open in the use position and relatively closed in the access position.

Specifically, a rear portion of the outsole 616 secured to the rear midsole component 614B has a concavity 73 that particularly creates a ground-contact surface at a medial region 75A at a medial side of the concavity 73 and at a lateral region 75B at a lateral side of the concavity 73 with the concavity 73 lifted from the ground plane when the sole structure 612 is in the access position to provide stability, as described with respect to the concavity 73 of FIG. 4.

Like the sole structure 12, the sole structure 612 particularly rests on the transversely spaced regions 75A, 75B and on a front region 75C of the front portion of the outsole 616 when the sole structure 612 is in the access position. The regions 75A, 75B, and 75C particularly are spaced apart in a tripod arrangement.

A rear wall 20 of the front midsole component 614A and a front wall 22 of the rear midsole component 614B particularly are juxtaposed. The outsole 616 connects the front midsole component 614A to the rear midsole component 614B, is disposed on the rear wall 20 of the front midsole component 614A and the front wall 22 of the rear midsole component 614B, and/or defines the groove(s) 17 at a lower side of the sole structure 612 between the front midsole component 614A and the rear midsole component 614B. The divided footwear upper 18 includes the front upper portion 18A fixed to the front midsole component 614A and the separate rear upper portion 18B fixed to the rear midsole component 614B.

Although only the medial side 34 of the footwear 610 is shown in FIG. 23, as described with respect to midsole components 14A and 14B of FIGS. 1 and 2, rear edges 60A, 66A of the respective side walls 60, 66 of the front midsole component 614A and front edges 61A, 63A of the respective side walls 61, 63 of the rear midsole component 614B angle forward above the groove 17 in the use position. This causes the side walls 61, 63 of the rear midsole component 614B to extend partially over the side walls 60, 66, respectively, of the front midsole component 614A forward of the groove 17.

Specifically, one or more interfitting features of the midsole components 614A, 614B are thus disposed both forward and rearward of the groove 17: the side walls 61, 63 of the rear midsole component 614B overlaying the side walls 60, 66 of the front midsole component 614A forward of the groove 17, and/or the rearward-extending heel footbed 638 of the front midsole component 614A overlaying the rear midsole component 614B rearward of the groove 17.

The article of footwear 610 may be manufactured by a method that includes providing a connecting member 616 with at least one groove 17 substantially extending transversely between and separating a forward expanse and a rear expanse of the connecting member 616. The method may include connecting the front midsole component 614A to the connecting member 616 forward of the groove 17, and connecting the rear midsole component 614B to the connecting member 616 rearward of the groove 17, with the front midsole component 614A pivotable relative to the rear midsole component 614B at the groove(s) 17.

FIG. 24 is a plan view of an interior side of the elastic biasing member 650 removed from the article of footwear 610 of FIG. 23. The hook-and-loop fasteners 657 each include a first fastener component 657A to be secured to the interior side of the elastic biasing member 650 such as with stitches 659 or alternatively with adhesive or thermal bonding.

Figure 26:
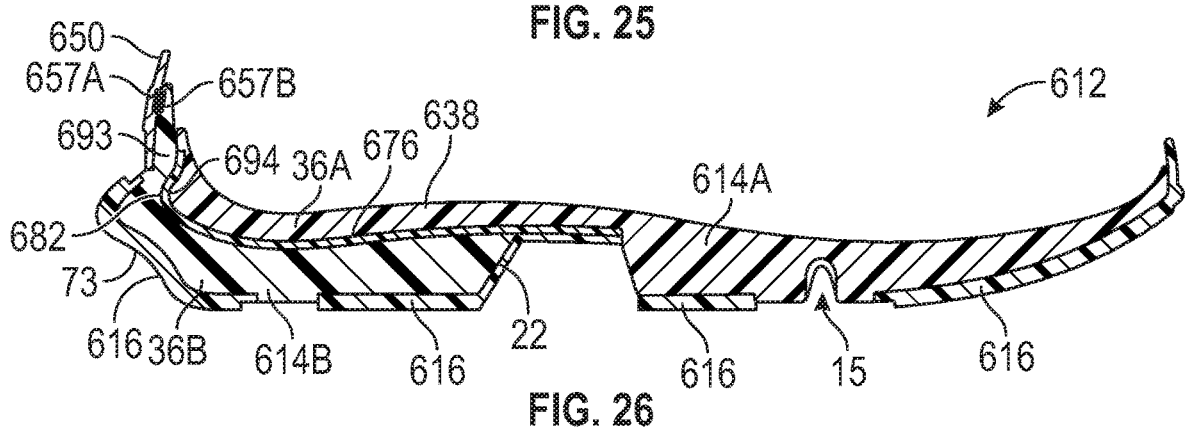
FIG. 26 is a cross-sectional view of the sole structure of the article of the sole structure of FIG. 25 taken at lines 26-26 in FIG. 25.
Figure 32:
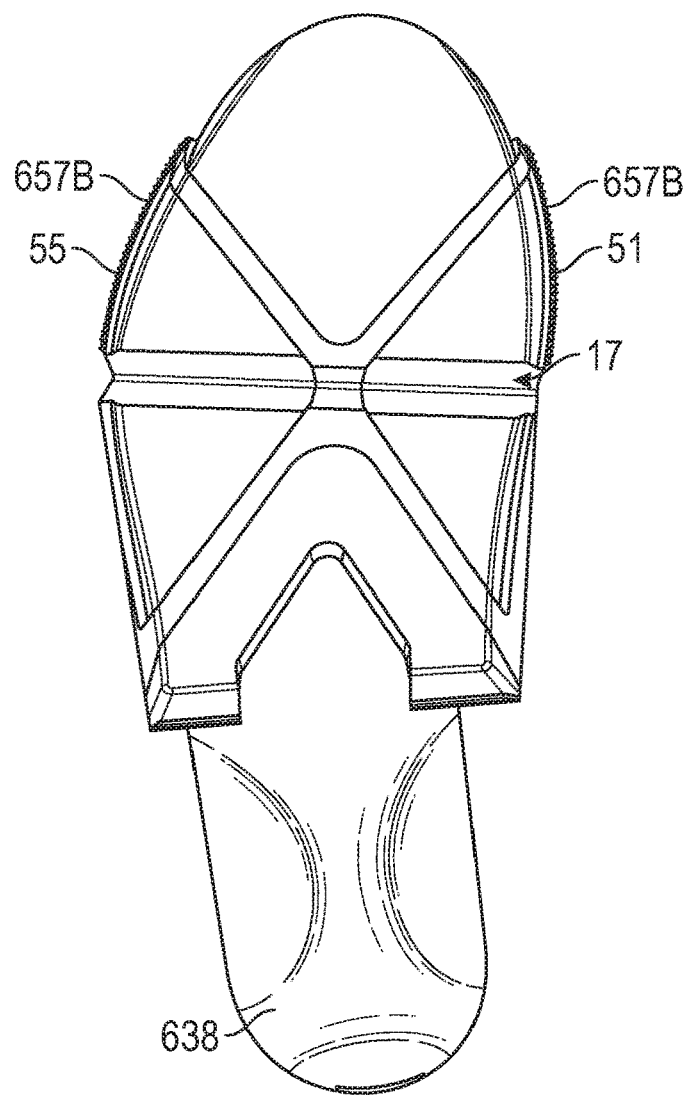
FIG. 32 is a bottom view of the front midsole component of FIG. 27.

The hook-and-loop fasteners 657 each include a second fastener component 657B to be secured to the exterior surface of the front or rear midsole components 614A, 614B, as shown in FIGS. 26, 31 and 32 such as with adhesive, stitching, or thermal bonding.

The second fastener components 657B particularly are to be secured to the front and rear midsole components 614A, 614B at the first, second, and/or third locations 51, 53, 55 described with respect to the article of footwear 10. The first fastener components 657A are configured to releasably secure to the second fastener components 657B so that the elastic biasing member 650 is releasably secured to the front and rear midsole components 614A, 614B at the first, second, and/or third locations, 51, 53, 55, and/or is unsecured to the midsole components 614A, 614B between the first location 51 and the second location 53, and/or between the third location 55 and the second location 53.

For example, the first fastener components 657A may be a material that includes a plurality of hooks, the second fastener components 657B may be a material that includes a plurality of loops configured to engage with the hooks, or either or both of the fastener components 657A, 657B may include both hooks and loops. Suitable materials with hooks and loops for the hook-and-loop fasteners 657 are available from 3M Corporation at 3M Center, St. Paul, Minn. under the trade name VELCRO™.

A first fastener 657 at the first location 51 particularly includes the second fastener component 657B shown at the first location 51 in FIG. 31 and/or the first fastener component 657A shown at the right in FIG. 24. A second fastener 657 at the second location 53 in FIG. 26 particularly includes the second fastener component 657B secured to the rear wall of the rear midsole component 614B and/or the first fastener component 657A shown at the middle of the elastic biasing member 650 in FIG. 24. A third fastener 657 at the third location 55 particularly includes the second fastener component 657B shown at the third location 55 in FIG. 31 and/or the first fastener component 657A shown at the left in FIG. 24.

Figure 25:
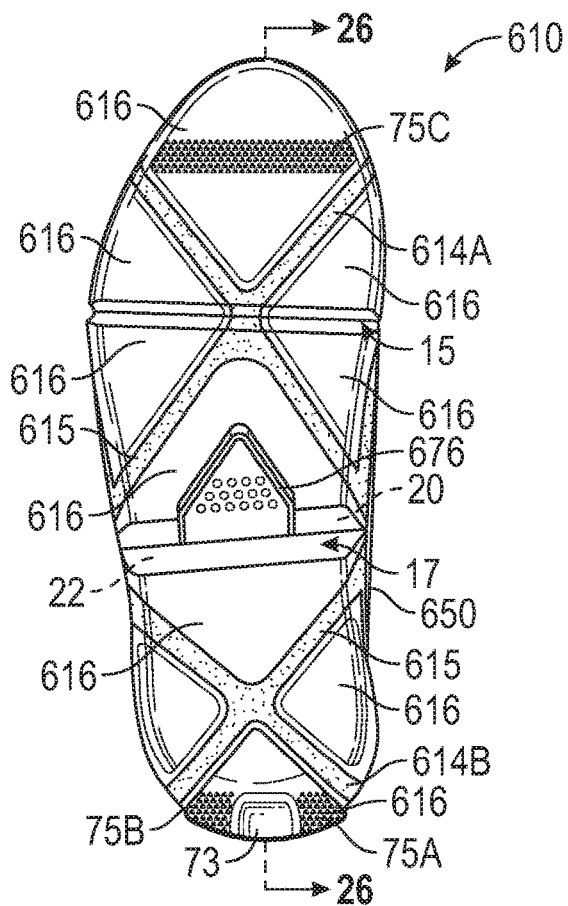
FIG. 25 is a bottom view of the article of footwear of FIG. 23.

FIG. 25 is a bottom view of the article of footwear 610 of FIG. 23. It is evident in FIG. 25 that the outsole 616 particularly is a multi-piece outsole, and/or particularly includes gaps 615 between the multiple pieces creating an X pattern below the front midsole component 614A and/or below the rear midsole component 614B so that the front midsole component 614A and/or the rear midsole component 614B are each exposed in the gaps from below. A portion of the externally-secured plate 676 discussed herein is also exposed from below.

Figure 27:
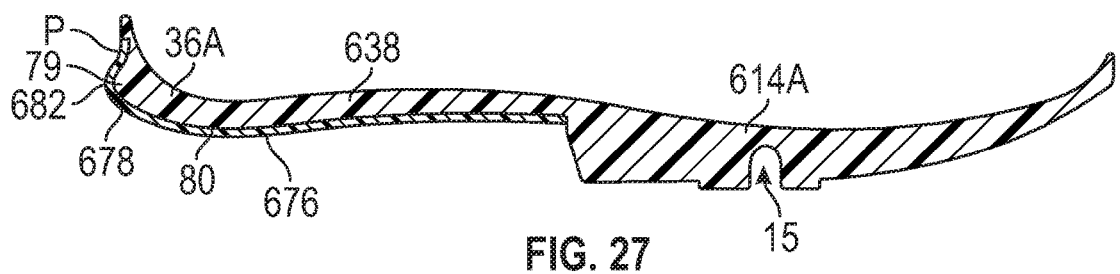
FIG. 27 is a cross-sectional view of a front midsole component and a plate of the sole structure of FIG. 26.
Figure 28:
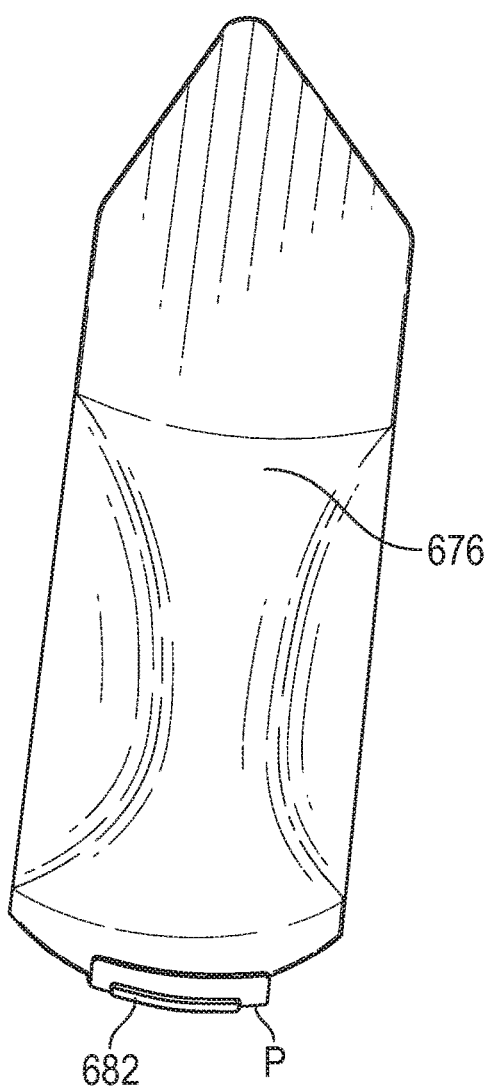
FIG. 28 is a plan view of the plate of FIG. 27.
Figure 29:
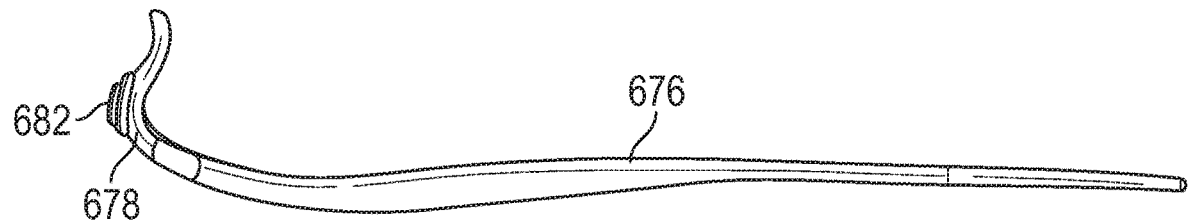
FIG. 29 is a lateral side view of the plate of FIG. 27.

FIG. 26 is a cross-sectional view of the sole structure 612 of FIG. 25 taken at lines 26-26 in FIG. 25. FIG. 27 is a cross-sectional view of only the front midsole component 614A and the plate 676. FIG. 28 is a plan view of the plate 676, FIG. 29 is a lateral side view of the plate 676, and FIG. 30 is a rear view of the plate 676.

As can be seen in FIGS. 26 and 27, the plate 676 particularly includes an integral rear stiffening portion 678 on a rear of the body 36A to define a rear periphery P of the heel footbed 638. The plate 676 particularly may be secured to the bottom and rear of the body 36A of the heel footbed 638, such as with adhesive.

The rear stiffening portion 678 extends around a rear 79 of the body 36A from the medial side to the lateral side and extends forward under the bottom 80 of the body 36A. Specifically, the body 36A may be relatively less hard than the plate 676. For example, the body 36A may have a first hardness and the plate 676 including the rear stiffening portion 678 may have a second hardness greater than the first hardness.

By particularly securing the plate 676 to the bottom of the body 36A rather than embedding it in the body 36A, more of the softer material of the body 36A is between the foot and the plate 676. The harder rear stiffening portion 678 particularly may also have a lower coefficient of friction than the body 36A, which may enable the heel footbed 38 to move more easily past the rear upper portion 18B between the access position and the use position than would a heel footbed 38 without the rear stiffening portion 678. The rear stiffening portion 678 may be any of the materials described with respect to the external stiffening layer 78.

The rear stiffening portion 678 also includes at least one tab 682 protruding rearward at the rear periphery P. Because the protruding tab 682 is of the harder material of the rear stiffening portion 678, the tab 682 can compress and move past softer, compressible portions of the rear upper portion 18B and interlock with the rear midsole component 614B, which particularly includes a rib 693 and a recess 694 below the rib 693.

Specifically, the tab 682 of the rear stiffening portion 678 interfaces with the rib 693 when the sole structure 612 moves from the access position to the use position, and when the sole structure 612 moves from the use position to the access position. The extension of the tab 682 rearward, and the protrusion of the rib 693 forward causes the relatively soft body 36A at the heel footbed 638 and/or the relatively soft body 36B of the rear midsole component 614B to elastically deform in the longitudinal direction of the footwear 610 particularly in order to allow the tab 682 to ride along the exterior surface of the rib 693 and move over the rib 693. The plate 676 particularly helps to prevent twisting or buckling of the heel footbed 638 during the deformation. Once the tab 682 moves past the rib 693, the body 36A and/or 36B resiliently recovers from the elastic deformation by springing back to a pre-deformed state.

Figure 33:
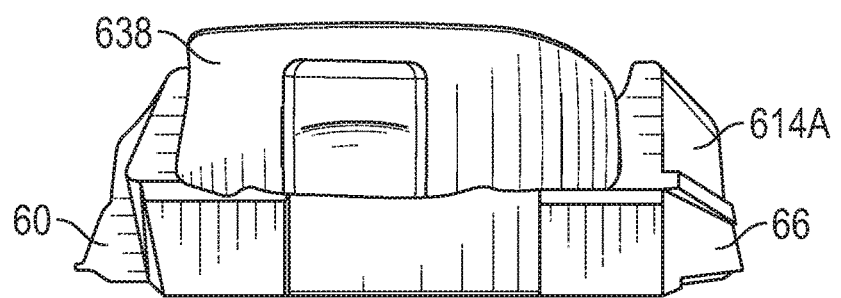
FIG. 33 is a rear view of the front midsole component of FIG. 27.

FIG. 31 is a plan view of the front midsole component 614A of FIG. 27 with the second fastener components 657B secured to the medial side wall 60 and the lateral sidewall 66 of the front midsole component 614A. FIG. 32 is a bottom view of the front midsole component 614A showing the groove 17. FIG. 33 is a rear view of the front midsole component 614A of FIG. 27. As indicated, the front midsole component 614A is a one-piece configuration that includes the heel footbed 638.

The following Clauses provide example configurations of an article of footwear disclosed herein.

Clause 1: An article of footwear comprising: a sole structure including: a front midsole component and a rear midsole component; and a connecting member connecting the front midsole component to the rear midsole component and defining a groove at a lower side of the sole structure between the front midsole component and the rear midsole component; wherein the front midsole component and the rear midsole component are pivotable relative to one another at the groove between a use position and an access position; and wherein confronting surfaces of the connecting member at the groove are closer to one another in the access position than in the use position so that the groove is relatively open in the use position, and the groove is relatively closed in the access position.

Clause 2: The article of footwear of Clause 1, wherein a side wall of the front midsole component and a side wall of the rear midsole component confront one another above the groove in the use position.

Clause 3: The article of footwear of Clause 2, wherein a rear edge of the side wall of the front midsole component and a front edge of the side wall of the rear midsole component angle forward from the groove in the use position, with the side wall of the rear midsole component extending partially over the side wall of the front midsole component forward of the groove.

Clause 4: The article of footwear of Clause 2 or 3, wherein: a front surface of the side wall of the rear midsole component is disposed at an acute angle to an exterior side surface of the side wall of the rear midsole component; and a rear surface of the side wall of the front midsole component is disposed at an obtuse angle to an exterior side surface of the side wall of the front midsole component.

Clause 5: The article of footwear of Clause 4, wherein the front surface of the side wall of the rear midsole component faces the rear surface of the side wall of the front midsole component in the use position.

Clause 6: The article of footwear of any of Clauses 2-5, wherein: a front surface of the side wall of the rear midsole component angles rearward from an outer edge of the front surface to an inner edge of the front surface; and a rear surface of the side wall of the front midsole component angles rearward from an outer edge of the front surface to an inner edge of the front surface.

Clause 7: The article of footwear of any of Clauses 1-6, wherein: the front midsole component includes a heel footbed that extends over the groove and overlays the rear midsole component in the use position; and/or the heel footbed is spaced apart from the rear midsole component in the access position.

Clause 8: The article of footwear of any of Clauses 1-7, wherein the front midsole component extends in a forefoot region, a midfoot region, and a heel region of the article of footwear in the use position.

Clause 9: The article of footwear of any of Clauses 1-8, wherein: the heel footbed includes a body, and a plate embedded in or secured externally to the body; and/or the plate is relatively more rigid than the body.

Clause 10: The article of footwear of Clause 9, wherein the plate is entirely rearward of the groove in the use position.

Clause 11: The article of footwear of Clause 9, wherein the plate extends at least to the groove in the use position.

Clause 12: The article of footwear of any of Clauses 1-11, wherein: the front midsole component includes a heel footbed that extends over the groove and overlays the rear midsole component in the use position; the heel footbed includes a body and an external stiffening layer on a rear of the body, the external stiffening layer defining a rear periphery of the heel footbed; and the body has a first hardness and the external stiffening layer has a second hardness greater than the first hardness.

Clause 13: The article of footwear of Clause 12, further comprising: a rear upper portion secured to the rear midsole component; wherein the external stiffening layer includes a tab protruding rearward at the rear periphery; and/or wherein the rear upper portion has a protrusion that protrudes forward above the heel footbed when the front midsole component and the rear midsole component are in the use position; and wherein the tab compresses the protrusion when the sole structure moves from the access position to the use position.

Clause 14: The article of footwear of Clause 12 or 13, wherein: the rear midsole component includes a rib that projects forward at a rear of a foot-facing surface of the rear midsole component; and/or wherein the external stiffening layer includes a tab protruding rearward at the rear periphery; and/or wherein the tab interfaces with the rib when the sole structure moves from the access position to the use position, the tab being disposed below the rib in the use position.

Clause 15: The article of footwear of any of Clauses 1-14, wherein: the rear midsole component includes a body and a stiffening component disposed on the body; the stiffening component is relatively harder than the body; and/or the stiffening component includes the rib.

Clause 16: The article of footwear of any of Clauses 1-15, wherein at least one of the rear midsole component or the heel footbed elastically deforms when the tab interfaces with the rib, and resiliently returns to a pre-deformed state when the sole structure is in the use position, the rib and the tab locking the sole structure in the use position.

Clause 17: The article of footwear of any of Clauses 1-16, wherein the stiffening component defines a recess below the rib, and the tab is disposed in the recess when the sole structure is in the use position.

Clause 18: The article of footwear of any of Clauses 1-17, wherein: the sole structure includes an outsole; the rear midsole component defines a ridge at a rearmost extent of the rear midsole component; and the outsole wraps upward along the rear midsole component over the ridge.

Clause 19: The article of footwear of any of Clauses 1-18, further comprising: an elastic biasing member fixed to a medial side wall of the front midsole component and to a lateral side wall of the front midsole component forward of the groove, and fixed to the rear midsole component rearward of the groove; and wherein the elastic biasing member is bi-stable in the use position and the access position.

Clause 20: The article of footwear of Clause 19, wherein: the elastic biasing member is fixed to the medial side wall of the front midsole component at a first location, to the rear midsole component at a second location, and to the lateral side wall of the front midsole component at a third location; and the elastic biasing member is unfixed between the first location and the second location, and between the second location and the third location.

Clause 21: The article of footwear of Clause 20, wherein the elastic biasing member is removably fixed to the medial side wall of the front midsole component at the first location with a first fastener, to the rear midsole component at the second location with a second fastener, and/or to the lateral side wall of the front midsole component at the third location with a third fastener.

Clause 22: The article of footwear of Clause 20 or 21, wherein: a rear edge of a side wall of the front midsole component is adjacent to a front edge of a side wall of the rear midsole component above the groove when the sole structure is in the use position; and the elastic biasing member covers the rear edge and the front edge when the sole structure is in the use position.

Clause 23: The article of footwear of any of Clauses 1-22, wherein: the connecting member is an outsole; the outsole has a bottom portion secured to a bottom of the rear midsole component and a rear portion secured to a rear wall of the rear midsole component; and/or the bottom portion of the outsole is a ground-contact surface with a horizontal ground plane in the use position, and/or the rear portion of the outsole is the ground-contact surface with the horizontal ground plane in the access position.

Clause 24: The article of footwear of Clause 23, wherein the rear portion of the outsole has an outer surface with a concavity, and/or the outsole is spaced apart from the horizontal ground plane at the concavity in the access position so that the ground-contact surface of the rear portion of the outsole includes a medial region at a medial side of the concavity and a lateral region at a lateral side of the concavity.

Clause 25: The article of footwear of any of Clauses 1-22, wherein: the sole structure further comprises an outsole having a front bottom portion secured to a bottom of the front midsole component, a rear bottom portion secured to a bottom of the rear midsole component, and having a rear portion secured to a rear wall of the rear midsole component; at least one of the rear wall of the rear midsole component and the rear portion of the outsole has an outer surface with a concavity; and in the access position, the sole structure is lifted away from a horizontal ground plane at the groove and rests on the front bottom portion of the outsole and on the rear bottom portion of the outsole at a medial side of the concavity and at a lateral side of the concavity with the concavity spaced apart from the horizontal ground plane.

Clause 26: The article of footwear of any of Clauses 1-22, wherein the connecting member comprises an outsole defining the groove and lining a rear wall of the front midsole component and a front wall of the rear midsole component at the groove.

Clause 27: The article of footwear of any of Clauses 1-26, wherein the connecting member comprises a textile component.

Clause 28: The article of footwear of any of Clauses 1-27, wherein the connecting member comprises a plate defining the groove and secured to a rear wall of the front midsole component and to a front wall of the rear midsole component at the groove.

Clause 29: The article of footwear of Clause 28, further comprising: a rib secured at a wall of the connecting member in the groove and extending outward into the groove.

Clause 30: The article of footwear of any of Clauses 1-29, wherein the connecting member includes a front portion connected to the front midsole component and a rear portion connected to the rear midsole component, and the connecting member further comprises a hinge pin extending transversely relative to and hingedly connecting the front portion of the connecting member to the rear portion of the connecting member.

Clause 31: The article of footwear of any of Clauses 1-30, further comprising: a divided footwear upper including a front upper portion fixed to the front midsole component and a separate rear upper portion fixed to the rear midsole component; wherein at least parts of the front upper portion and the rear upper portion are spaced further apart from one another in the access position than in the use position.

Clause 32: The article of footwear of Clause 31, wherein the rear upper portion includes an elastic heel band.

Clause 33: The article of footwear of any of Clauses 1-32, wherein the rear midsole component is separate from, not directly connected to, and non-integral with the front midsole component.

Clause 34: A method of manufacturing an article of footwear, the method comprising: providing a connecting member with a front portion, a rear portion, and a groove extending transversely between and separating the front portion and the rear portion; connecting a front midsole component to the front portion of the connecting member; and connecting a rear midsole component to the rear portion of the connecting member, with the front midsole component pivotable relative to the rear midsole component at the groove.

Clause 35: The method of Clause 34, further comprising: molding the connecting member to form the front portion, the rear portion, and the groove prior to connecting the front midsole component to the front portion and the rear midsole component to the rear portion.

Clause 36: The method of Clause 35, wherein connecting the front midsole component to the front portion of the connecting member and connecting the rear midsole component to the rear portion of the connecting member is by molding the front midsole component to the front portion of the connecting member and molding the rear midsole component to the rear portion of the connecting member.

Clause 37: The method of Clause 35, further comprising: connecting a front portion of an outsole to the front portion midsole component forward of the connecting member; and connecting a rear portion of the outsole to the rear portion of the midsole component rearward of the connecting member.

Clause 38: The method of any of Clauses 34-37, wherein the connecting member is an outsole.

Clause 39: The method of any of Clauses 34-37, wherein the connecting member is a textile component, and the method further comprises: connecting a front portion of an outsole to a front portion of a textile component; and connecting a rear portion of an outsole to a rear portion of the textile component.

Clause 40: The method of any of Clauses 34-39, further comprising securing a rib at a wall of the connecting member in the groove.

Clause 41: The method of any of Clauses 34-40, wherein the connecting member, the front midsole component, and the rear midsole component are co-molded.

Clause 42: The method of any of Clauses 34-41, wherein connecting the front midsole component to the front portion of the connecting member and connecting the rear midsole component to the rear portion of the connecting member is by printing the front midsole component to the front portion of the connecting member and printing the rear midsole component to the rear portion of the connecting member.

Clause 45: An article of footwear comprising: a sole structure including: a front midsole component and a separate rear midsole component; wherein a rear wall of the front midsole component and a front wall of the rear midsole component are juxtaposed; and an outsole connecting the front midsole component to the rear midsole component and disposed on the rear wall of the front midsole component and the front wall of the rear midsole component and defining a groove at a lower side of the sole structure between the front midsole component and the rear midsole component; and a divided footwear upper including a front upper portion fixed to the front midsole component and a separate rear upper portion fixed to the rear midsole component; wherein the front midsole component and the rear midsole component are pivotable relative to one another at the groove between a use position and an access position.

Clause 46: The article of footwear of Clause 45, wherein the outsole lines the rear wall and the front wall.

Clause 47: The article of footwear of any of Clauses 45-46, wherein the front midsole component includes a heel footbed that extends over the groove and overlays the rear midsole component in the use position; and wherein rear edges of side walls of the front midsole component and front edges of side walls of the rear midsole component angle forward above the groove in the use position, the side walls of the rear midsole component extending partially over the side walls of the front midsole component forward of the groove.

Clause 48: The article of footwear of Clause 47, wherein the heel footbed is spaced apart from the rear upper portion in the access position, extending rearward and upward from the front midsole component.

Clause 49: The article of footwear of any of Clauses 45-48, wherein: the rear midsole component protrudes rearward of the rear upper portion to a ridge above the rear wall of the rear midsole component; and the outsole wraps upward along the rear midsole component over the ridge.

Clause 50: The article of footwear of any of Clauses 45-49, further comprising:
an elastic strap fixed to a medial side wall of the front midsole component at a first location, to the rear midsole component at a second location, and to a lateral side wall of the front midsole component at a third location and unfixed between the first location and the second location, and between the second location and the third location.

To assist and clarify the description of various embodiments, various terms are defined herein. Unless otherwise indicated, the following definitions apply throughout this specification (including the claims). Additionally, all references referred to are incorporated herein in their entirety.

An "article of footwear", a "footwear article of manufacture", and "footwear" may be considered to be both a machine and a manufacture. Assembled, ready to wear footwear articles (e.g., shoes, sandals, boots, etc.), as well as discrete components of footwear articles (such as a midsole, an outsole, an upper component, etc.) prior to final assembly into ready to wear footwear articles, are considered and alternatively referred to herein in either the singular or plural as "article(s) of footwear".

"A", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims.

The term "longitudinal" refers to a direction extending a length of a component. For example, a longitudinal direction of a shoe extends between a forefoot region and a heel region of the shoe. The term "forward" or "anterior" is used to refer to the general direction from a heel region toward a forefoot region, and the term "rearward" or "posterior" is used to refer to the opposite direction, i.e., the direction from the forefoot region toward the heel region. In some cases, a component may be identified with a longitudinal axis as well as a forward and rearward longitudinal direction along that axis. The longitudinal direction or axis may also be referred to as an anterior-posterior direction or axis.

The term "transverse" refers to a direction extending a width of a component. For example, a transverse direction of a shoe extends between a lateral side and a medial side of the shoe. The transverse direction or axis may also be referred to as a lateral direction or axis or a mediolateral direction or axis.

The term "vertical" refers to a direction generally perpendicular to both the lateral and longitudinal directions. For example, in cases where a sole is planted flat on a ground surface, the vertical direction may extend from the ground surface upward. It will be understood that each of these directional adjectives may be applied to individual components of a sole. The term "upward" or "upwards" refers to the vertical direction pointing towards a top of the component, which may include an instep, a fastening region and/or a throat of an upper. The term "downward" or "downwards" refers to the vertical direction pointing opposite the upwards direction, toward the bottom of a component and may generally point towards the bottom of a sole structure of an article of footwear.

The "interior" of an article of footwear, such as a shoe, refers to portions at the space that is occupied by a wearer's foot when the shoe is worn. The "inner side" of a component refers to the side or surface of the component that is (or will be) oriented toward the interior of the component or article of footwear in an assembled article of footwear. The "outer side" or "exterior" of a component refers to the side or surface of the component that is (or will be) oriented away from the interior of the shoe in an assembled shoe. In some cases, other components may be between the inner side of a component and the interior in the assembled article of footwear. Similarly, other components may be between an outer side of a component and the space external to the assembled article of footwear. Further, the terms "inward" and "inwardly" refer to the direction toward the interior of the component or article of footwear, such as a shoe, and the terms "outward" and "outwardly" refer to the direction toward the exterior of the component or article of footwear, such as the shoe. In addition, the term "proximal" refers to a direction that is nearer a center of a footwear component or is closer toward a foot when the foot is inserted in the article of footwear as it is worn by a user. Likewise, the term "distal" refers to a relative position that is further away from a center of the footwear component or is further from a foot when the foot is inserted in the article of footwear as it is worn by a user. Thus, the terms proximal and distal may be understood to provide generally opposing terms to describe relative spatial positions.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. An article of footwear comprising:
 a sole structure including:
  a front midsole component and a rear midsole component separate from and non-integral with the front midsole component; and
  a connecting member connecting the front midsole component to the rear midsole component and defining a groove at a lower side of the sole structure between the front midsole component and the rear midsole component;
 wherein the connecting member includes a front wall secured to the front midsole component, a rear wall secured to the rear midsole component, and a peak at which the front wall is connected to the rear wall;
 wherein the front wall, the rear wall, and the peak are one piece;
 wherein the front midsole component and the rear midsole component are pivotable relative to one another at the groove between a use position and an access position by the connecting member flexing at the peak; and
 wherein confronting surfaces of the connecting member at the groove are closer to one another in the access position than in the use position so that the groove is relatively open in the use position, and the groove is relatively closed in the access position.

2. The article of footwear of claim 1, wherein a side wall of the front midsole component and a side wall of the rear midsole component confront one another above the groove in the use position.

3. The article of footwear of claim 2, wherein a rear edge of the side wall of the front midsole component and a front edge of the side wall of the rear midsole component angle forward from the groove in the use position, with the side wall of the rear midsole component extending partially over the side wall of the front midsole component forward of the groove.

4. The article of footwear of claim 2, wherein:
 a front surface of the side wall of the rear midsole component is disposed at an acute angle to an exterior side surface of the side wall of the rear midsole component; and
 a rear surface of the side wall of the front midsole component is disposed at an obtuse angle to an exterior side surface of the side wall of the front midsole component.

5. The article of footwear of claim 2, wherein:
 a front surface of the side wall of the rear midsole component angles rearward in a transverse direction from an outer edge of the front surface to an inner edge of the front surface; and
 a rear surface of the side wall of the front midsole component angles rearward in a transverse direction from an outer edge of the rear surface to an inner edge of the rear surface.

6. The article of footwear of claim 1, wherein:
 the front midsole component includes a heel footbed that extends over the groove and overlays the rear midsole component in the use position; and
 the heel footbed is spaced apart from the rear midsole component in the access position.

7. The article of footwear of claim 6, wherein:
 the heel footbed includes a body and a plate embedded in or secured externally to the body; and
 the plate is relatively more rigid than the body.

8. The article of footwear of claim 1, wherein:
 the front midsole component includes a heel footbed that extends over the groove and overlays the rear midsole component in the use position;
 the heel footbed includes a body and an external stiffening layer on a rear of the body, the external stiffening layer defining a rear periphery of the heel footbed; and
 the body has a first hardness and the external stiffening layer has a second hardness greater than the first hardness.

9. The article of footwear of claim 8, wherein:
 the rear midsole component includes a rib that projects forward at a rear of a foot-facing surface of the rear midsole component;
 the external stiffening layer includes a tab protruding rearward at the rear periphery; and
 the tab interfaces with the rib when the sole structure moves from the access position to the use position, the tab being disposed below the rib in the use position.

10. The article of footwear of claim 1, wherein:
 the sole structure includes an outsole;
 the rear midsole component defines a ridge at a rearmost extent of the rear midsole component; and the outsole wraps upward along the rear midsole component over the ridge.

11. The article of footwear of claim 1, further comprising:
an elastic biasing member fixed to a medial side wall of the front midsole component and to a lateral side wall of the front midsole component forward of the groove, and fixed to the rear midsole component rearward of the groove; and
wherein the elastic biasing member is bi-stable in the use position and the access position.

12. The article of footwear of claim 11, wherein the elastic biasing member is removably fixed to the medial side wall of the front midsole component at a first location with a first fastener, to the rear midsole component at a second location with a second fastener, and to the lateral side wall of the front midsole component at a third location with a third fastener; and
the elastic biasing member is unfixed between the first location and the second location, and between the second location and the third location.

13. The article of footwear of claim 1, wherein:
the connecting member is an outsole;
the outsole has a bottom portion secured to a bottom of the rear midsole component and a rear portion secured to a rear wall of the rear midsole component; and
the bottom portion of the outsole is a ground-contact surface with a horizontal ground plane in the use position, and the rear portion of the outsole is the ground-contact surface with the horizontal ground plane in the access position.

14. The article of footwear of claim 1, further comprising:
a divided footwear upper including a front upper portion fixed to the front midsole component and a separate rear upper portion fixed to the rear midsole component;
wherein at least parts of the front upper portion and the rear upper portion are spaced further apart from one another in the access position than in the use position.

15. The article of footwear of claim 1, further comprising:
a rear upper portion fixed to the rear midsole component;
a front upper portion fixed to the front midsole component;
an elastic biasing member fixed forward of the groove at a medial side of the front midsole component or at a medial side of the front upper portion, and fixed forward of the groove at a lateral side of the front midsole component or at a lateral side of the front upper portion, and wherein the elastic biasing member extends around a rear of the rear midsole component or around a rear of the rear upper portion.

16. The article of footwear of claim 11, wherein:
a rear edge of the lateral side wall of the front midsole component and a front edge of the lateral side wall of the rear midsole component angle forward from the groove in the use position, with the lateral side wall of the rear midsole component extending partially over the lateral side wall of the front midsole component forward of the groove; and
the elastic biasing member covers the rear edge of the lateral side wall of the front midsole component and the front edge of the lateral side wall of the rear midsole component in the use position.

17. The article of footwear of claim 1, wherein:
the connecting member is an outsole;
a rear portion of the outsole has an outer surface with a concavity; and
the outsole is spaced apart from a horizontal ground plane at the concavity in the access position so that a ground-contact surface of the rear portion of the outsole includes a medial region at a medial side of the concavity and a lateral region at a lateral side of the concavity.

18. An article of footwear comprising:
a sole structure including:
a front midsole component and a rear midsole component; and
a connecting member connecting the front midsole component to the rear midsole component and defining a groove at a lower side of the sole structure between the front midsole component and the rear midsole component;
wherein:
the front midsole component and the rear midsole component are pivotable relative to one another at the groove between a use position and an access position;
confronting surfaces of the connecting member at the groove are closer to one another in the access position than in the use position so that the groove is relatively open in the use position, and the groove is relatively closed in the access position;
the front midsole component includes a heel footbed that extends over the groove and overlays the rear midsole component in the use position;
the heel footbed is spaced apart from the rear midsole component in the access position;
the heel footbed includes a body and a plate embedded in or secured externally to the body; and
the plate is relatively more rigid than the body.

19. An article of footwear comprising:
a sole structure including:
a front midsole component and a rear midsole component; and
a connecting member connecting the front midsole component to the rear midsole component and defining a groove at a lower side of the sole structure between the front midsole component and the rear midsole component;
wherein:
the front midsole component and the rear midsole component are pivotable relative to one another at the groove between a use position and an access position;
confronting surfaces of the connecting member at the groove are closer to one another in the access position than in the use position so that the groove is relatively open in the use position, and the groove is relatively closed in the access position;
the front midsole component includes a heel footbed that extends over the groove and overlays the rear midsole component in the use position;
the heel footbed includes a body and an external stiffening layer on a rear of the body, the external stiffening layer defining a rear periphery of the heel footbed; and
the body has a first hardness and the external stiffening layer has a second hardness greater than the first hardness.

20. The article of footwear of claim 19, wherein:
the rear midsole component includes a rib that projects forward at a rear of a foot-facing surface of the rear midsole component;
the external stiffening layer includes a tab protruding rearward at the rear periphery; and the tab interfaces with the rib when the sole structure moves from the access position to the use position, the tab being disposed below the rib in the use position.

\* \* \* \* \*